US012518519B2

(12) United States Patent
Hamamoto et al.

(10) Patent No.: US 12,518,519 B2
(45) Date of Patent: Jan. 6, 2026

(54) PREDICTOR CREATION DEVICE AND PREDICTOR CREATION METHOD

(71) Applicant: Hitachi, Ltd., Tokyo (JP)

(72) Inventors: Masaki Hamamoto, Tokyo (JP); Masashi Egi, Tokyo (JP); Masakazu Takahashi, Tokyo (JP); Hiroyuki Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 315 days.

(21) Appl. No.: 18/036,212

(22) PCT Filed: Nov. 22, 2021

(86) PCT No.: PCT/JP2021/042858
§ 371 (c)(1),
(2) Date: May 10, 2023

(87) PCT Pub. No.: WO2022/124065
PCT Pub. Date: Jun. 16, 2022

(65) Prior Publication Data
US 2023/0410488 A1    Dec. 21, 2023

(30) Foreign Application Priority Data
Dec. 9, 2020   (JP) ................. 2020-204028

(51) Int. Cl.
*G06V 10/80*   (2022.01)
*G06F 18/214*   (2023.01)
(Continued)

(52) U.S. Cl.
CPC ........... *G06V 10/80* (2022.01); *G06F 18/214* (2023.01); *G06N 3/02* (2013.01); *G06N 3/08* (2013.01);
(Continued)

(58) Field of Classification Search
CPC .............. G06V 10/80; G06V 10/7788; G06V 10/764; G06V 10/77; G06V 10/40;
(Continued)

(56) References Cited

U.S. PATENT DOCUMENTS 10,175,387 B2 * 1/2019 Kleeman ................ G06Q 10/04
2017/0293857 A1 * 10/2017 Stajner ............... G01C 21/3617
(Continued)

FOREIGN PATENT DOCUMENTS

CN      108537820 A  * 9/2018 .......... G06N 3/0454
JP      2018-512086 A    5/2018

OTHER PUBLICATIONS

Turner, Machine-Learning Techniques for Factor-Level Monotonic Neural Networks: U.S. Appl. No. 63/054,448 of US 2023/0297847 A1, filed Jul. 21, 2020, 28 pages. (Year: 2020).*
(Continued)

*Primary Examiner* — Henok Shiferaw
*Assistant Examiner* — Dennis Rosario
(74) *Attorney, Agent, or Firm* — MATTINGLY & MALUR, PC

(57) ABSTRACT

A predictor creation device including a processor configured to execute a program and a storage device that stores the program acquires a calibration target ensemble predictor obtained by combining a plurality of predictors based on a training data set which is a combination of training data and ground truth data, calculates a prediction basis characteristic related to a feature of the training data for each of the plurality of predictors, acquires an expected prediction basis characteristic related to the feature based on the prediction basis characteristic related to the feature as a result of outputting the prediction basis characteristic related to the calculated feature, determines a combination coefficient of each of the plurality of predictors based on the prediction
(Continued)

basis characteristic related to the feature and the expected prediction basis characteristic related to the feature, and calibrates the calibration target ensemble predictor based on the combination coefficient.

12 Claims, 13 Drawing Sheets

(51) Int. Cl.
| | |
|---|---|
| *G06N 3/02* | (2006.01) |
| *G06N 3/08* | (2023.01) |
| *G06N 3/0985* | (2023.01) |
| *G06N 5/04* | (2023.01) |
| *G06N 5/045* | (2023.01) |
| *G06N 7/02* | (2006.01) |
| *G06N 20/00* | (2019.01) |
| *G06V 10/40* | (2022.01) |
| *G06V 10/70* | (2022.01) |
| *G06V 10/77* | (2022.01) |
| *G06V 10/774* | (2022.01) |
| *G06V 10/778* | (2022.01) |
| *G06V 10/82* | (2022.01) |

(52) U.S. Cl.
CPC ............ *G06N 3/0985* (2023.01); *G06N 5/04* (2013.01); *G06N 5/045* (2013.01); *G06N 7/023* (2013.01); *G06N 20/00* (2019.01); *G06V 10/40* (2022.01); *G06V 10/70* (2022.01); *G06V 10/77* (2022.01); *G06V 10/774* (2022.01); *G06V 10/7788* (2022.01); *G06V 10/82* (2022.01); *G06T 2207/20081* (2013.01); *G06T 2207/20084* (2013.01)

(58) Field of Classification Search
CPC ...... G06V 10/82; G06V 10/70; G06V 10/774; G06V 10/776; G06N 20/00; G06N 20/20; G06N 3/08; G06N 3/084; G06N 5/04; G06N 5/045; G06N 7/023; G06N 3/02; G06N 3/0985; G06F 18/214; G06T 2207/20084; G06T 2207/20081; G06T 5/60

See application file for complete search history.

(56) References Cited

U.S. PATENT DOCUMENTS

| | | | |
|---|---|---|---|
| 2017/0371958 A1* | 12/2017 | Ganjam | G06F 16/353 |
| 2018/0046942 A1 | 2/2018 | Conroy et al. | |
| 2023/0153597 A1* | 5/2023 | De | G06N 20/00 706/38 |
| 2023/0297847 A1* | 9/2023 | Turner | G06N 3/082 706/15 |
| 2024/0351592 A1* | 10/2024 | Sadeghi | B60W 50/00 |
| 2024/0378437 A1* | 11/2024 | Friedman | G06N 3/084 |

OTHER PUBLICATIONS

Turner, Machine-Learning Techniques for Factor-Level Monotonic Neural Networks: U.S. Appl. No. 63/054,448: drawings: 5 figures of US 2023/0297847 A1, filed Jul. 21, 2020, 5 pages. (Year: 2020).*
Search machine translation of CN-108537820-A to Zhang, Dynamic Predicting Method, System And The Applicable Device, translated May 15, 2025, 28 pages. (Year: 2025).*
Laura Rieger, et al., "Interpretations are Useful Penalizing Explanations to Align Neural Networks With Prior Knowledge", 37th International Conference on Machine Learning (ICML 2020), Jul. 2020.
Raquel Rodriquez Perez, et al., Interpretation of machine learning models using shapley values: application to compound potency and multi-target activity predictions, Journal of Computer-Aided Molecular Design (2020) 34:1013-1026.
International Search Report of PCT/JP2021/042858 dated Feb. 22, 2022.

* cited by examiner

| QUANTITATIVE CONSTRAINT ID | c1 | c2 | c3 | ... |
|---|---|---|---|---|
| SAMPLE ID | FEATURE 1 | FEATURE 2 | FEATURE 3 | ... |
| s1 | 0.0 | - | - | ... |
| s2 | 7.2 | -2.2 | - | ... |
| ... | ... | ... | ... | ... |

| QUALITATIVE CONSTRAINT ID | d1 | d2 | d3 | d4 |
|---|---|---|---|---|
| | MAXIMUM EXPLANATION SCORE | MINIMUM EXPLANATION SCORE | MONO-TONICITY+ | MONO-TONICITY- |
| SAMPLE ID | FEATURE 2 | FEATURE 3 | FEATURE 1 | FEATURE 1 |
| s1 | FEATURE 1 | - | FEATURE 1 | FEATURE 4 |
| s2 | ... | ... | ... | ... |
| ... | | | | |

| CONSTRAINT ID | WEIGHT | ALLOWABLE EXPLANATION ERROR |
|---|---|---|
| c1 | 0.7 | 5 |
| c2 | 0.5 | 1.5 |
| ... | ... | ... |

PREDICTOR CREATION DEVICE AND PREDICTOR CREATION METHOD

INCORPORATION BY REFERENCE

This application is based upon and claims the benefit of priority from Japanese Patent Application No. 2020-204028, filed on Dec. 9, 2020, the entire contents of which are incorporated herein by reference.

TECHNICAL FIELD

The present invention relates to a predictor creation device and a predictor creation method for creating a predictor.

BACKGROUND ART

In recent years, there has been a trend in which a predictor (also referred to as a prediction model or artificial intelligence (AI)) created by a machine learning method such as deep neural network or gradient boosting is applied to various kinds of social tasks. In particular, in order to apply the technique to a task having a large social influence, in addition to high prediction accuracy of the predictor, validity (or also referred to as convincing) of a prediction basis is important.

An example of a predictor which determines benign and malignant skin cancer based on image data will be described. It is assumed that accuracy when test data is given to the predictor is very high. When it is found that a factor which most affects the prediction is whether a plaster is reflected near a tumor, it is difficult to trust the predictor and apply the predictor to actual application. Thus, validity of a prediction basis is an extremely important factor for determining whether a prediction result of the predictor can be trusted in the real world exceeding a range of training data or test data.

As a method of evaluating validity of a prediction basis, a method of visualizing a degree of influence (hereinafter, referred to as an explanation score) of each input value (also referred to as a feature) input to the predictor on a prediction result is generally used. The explanation score includes a Shapley value.

Normally, prediction accuracy of a predictor is evaluated, and a prediction basis is evaluated after confirming that the accuracy achieves a desired performance. Here, when the prediction basis does not have a desired characteristic, a unit which improves (or calibrates) a prediction basis characteristic is necessary.

As a technique for calibrating the prediction basis, there is the following NPL 1. NPL 1 discloses a technique for determining a coefficient parameter of a neural network in consideration of a characteristic of a prediction basis (or an explanation score) by setting a normalization term (also referred to as a penalty term) for a prediction basis in an objective function during model training for the neural network.

CITATION LIST

Non Patent Literature

NPL 1: Laura Rieger, Chandan Singh, W. James Murdoch, and Bin Yu, "INTERPRETATIONS ARE USEFUL PENALIZING EXPLANATIONS TO ALIGN NEURAL NETWORKS WITH PRIOR KNOWLEDGE", 37th International Conference on Machine Learning (ICML 2020), July 2020.

SUMMARY OF INVENTION

Technical Problem

Since the technique in NPL 1 adds a normalization term to an objective function during model training, the technique can be applied only to a differentiable machine learning model such as a neural network. For the same reason, the technique in NPL 1 cannot be applied to a main explanation score such as a Shapley value because only a differentiable explanation score can be applied. There are various types of explanation scores, and since it is up to a purchaser of a predictor, not a developer of the predictor, to decide which to use, limitation on a usable explanation score is a major practical problem. Thus, the technique in the related art for calibrating the prediction basis has a problem in versatility.

An object of the invention is to improve a prediction basis characteristic of a predictor.

Solution to Problem

A predictor creation device according to an aspect of the invention disclosed in the present application is a predictor creation device including a processor configured to execute a program, and a storage device that stores the program. The processor executes first acquisition processing of acquiring a calibration target ensemble predictor obtained by combining a plurality of predictors based on a training data set which is a combination of training data and ground truth data, calculation processing of calculating a prediction basis characteristic related to a feature of the training data for each of the plurality of predictors, second acquisition processing of acquiring an expected prediction basis characteristic related to the feature based on the prediction basis characteristic related to the feature as a result of outputting the prediction basis characteristic related to the feature calculated by the calculation processing, determination processing of determining a combination coefficient of each of the plurality of predictors based on the prediction basis characteristic related to the feature and the expected prediction basis characteristic related to the feature acquired in the second acquisition processing, and calibration processing of calibrating the calibration target ensemble predictor based on the combination coefficient determined by the determination processing.

Advantageous Effects of Invention

According to a representative embodiment of the invention, the prediction basis characteristic of the predictor can be improved. Problems, configurations, and effects other than those described above are made clear by the following description of the embodiments.

BRIEF DESCRIPTION OF DRAWINGS

FIG. 4 is a diagram of an example of a calibration parameter information table according to Embodiment 1.

FIG. 10 is a diagram showing an example of a data expected characteristic setting screen according to Embodiment 1.

DESCRIPTION OF EMBODIMENTS

Embodiment 1

Hereinafter, a predictor creation device according to Embodiment 1 will be described. There is a phenomenon that there are a large number of predictors having different prediction bases even for the same predicted value. This is because, in predicting a certain event, an amount and quality of data which can be observed are not sufficient for complexity of the real world, and complexity of a training model is also not sufficient, so that each predictor can capture only a few viewpoints of an entire event.

This phenomenon is generally treated as a troubled problem such as curse of dimensionality, but the predictor creation device according to the present embodiment improves a prediction basis of a model by actively using this phenomenon. That is, the predictor creation device gives a normalization term for a prediction basis to an objective function so that an ensemble of the two or more predictor groups approaches a desired prediction basis characteristic, and determines a combination coefficient of the ensemble. That is, in predicting a ground truth value, it means that the predictor creation device can create, by combining predictors capturing different viewpoints inherent in training data, a predictor more appropriately capturing an entire event.

The predictor creation device according to Embodiment 1 differentiates an objective function with respect to each combination coefficient of an ensemble instead of differentiating an objective function with respect to each feature. Accordingly, the predictor creation device can handle an explanation score or a function of a machine learning model as a constant. Therefore, the explanation score and the function of the machine learning model do not need to be differentiable. That is, by applying the predictor creation device according to Embodiment 1, a prediction basis of a predictor can be calibrated for any explanation score and any machine learning model. Hereinafter, detailed description will be given with reference to the accompanying drawings.

Hardware Configuration Example of Predictor Creation Device

Figure 1:
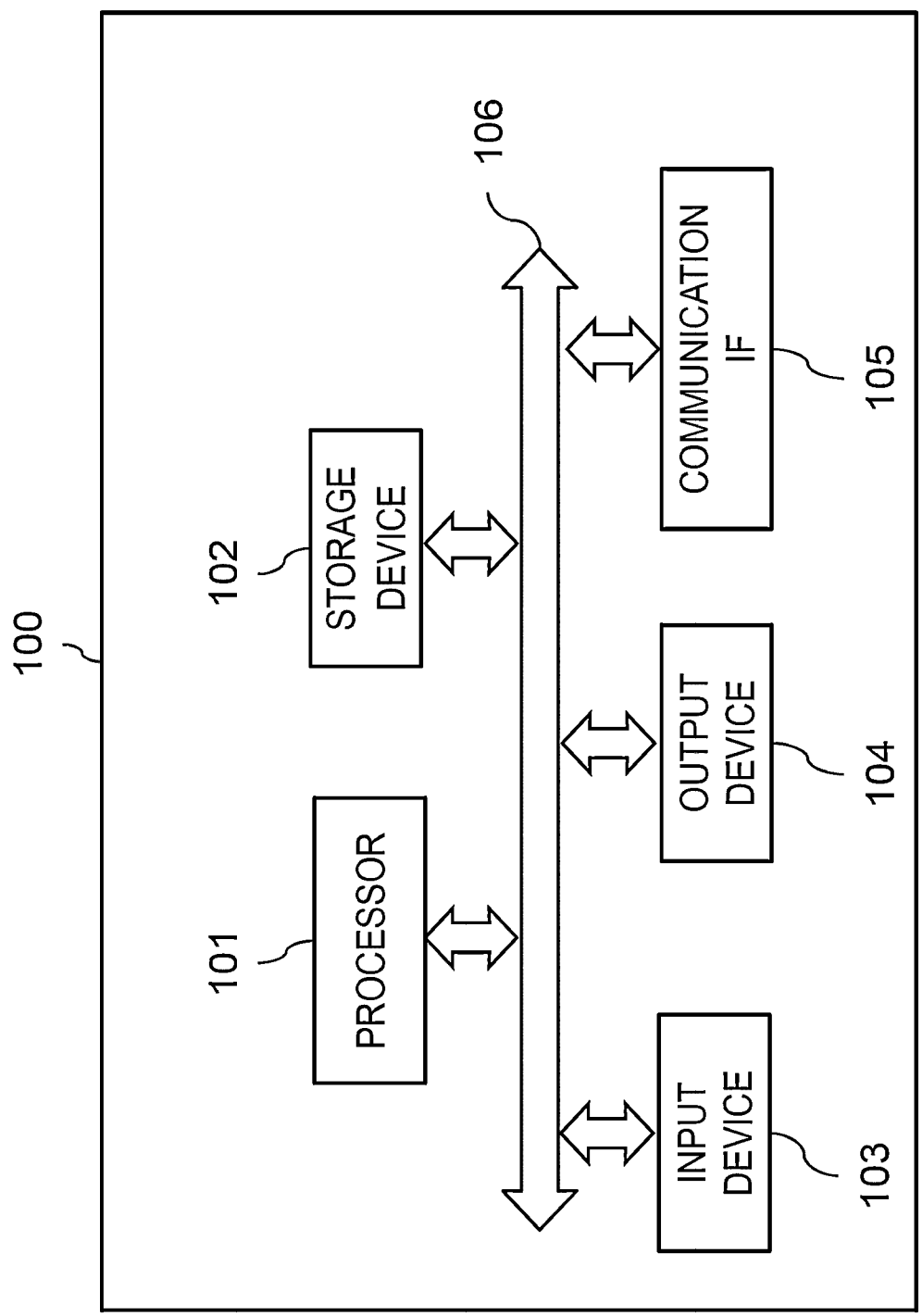
FIG. 1 is a block diagram showing a hardware configuration example of a predictor creation device according to Embodiment 1.

FIG. 1 is a block diagram showing a hardware configuration example of the predictor creation device according to Embodiment 1. A predictor creation device 100 includes a processor 101, a storage device 102, an input device 103, an output device 104, and a communication interface (communication IF) 105. The processor 101, the storage device 102, the input device 103, the output device 104, and the communication IF 105 are coupled by a bus 106. The processor 101 controls the predictor creation device 100. The storage device 102 serves as a work area for the processor 101. The storage device 102 is a non-transitory or temporary recording medium which stores various programs and data. Examples of the storage device 102 include a read only memory (ROM), a random access memory (RAM), a hard disk drive (HDD), and a flash memory. The input device 103 inputs data. Examples of the input device 103 include a keyboard, a mouse, a touch panel, a ten key pad, a scanner, and a microphone. The output device 104 outputs data. Examples of the output device 104 include a display, a printer, and a speaker. The communication IF 105 is coupled to a network and transmits and receives data.

Functional Configuration Example of Predictor Creation Device

Figure 2:
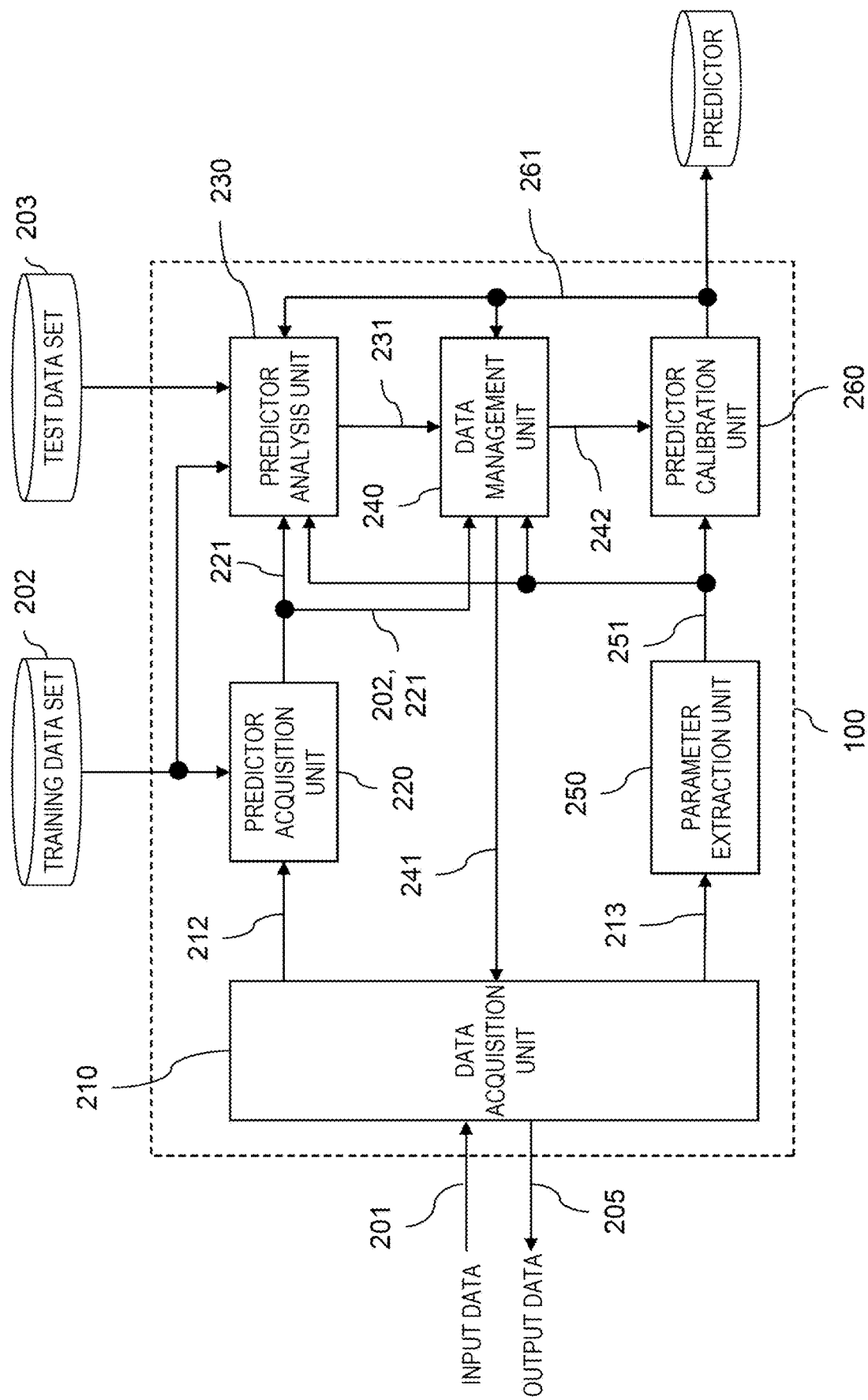
FIG. 2 is a block diagram showing a functional configuration example of the predictor creation device shown in FIG. 1.

FIG. 2 is a block diagram showing a functional configuration example of the predictor creation device 100 shown in FIG. 1. The predictor creation device includes a data acquisition unit 210, a predictor acquisition unit 220, a predictor analysis unit 230, a data management unit 240, a parameter extraction unit 250, and a predictor calibration unit 260. These units are implemented, for example, by causing the processor 101 to execute a program stored in the storage device 102 shown in FIG. 1.

The data acquisition unit 210 acquires input data 201 from outside of the predictor creation device 100, inputs the input data 201 into the predictor creation device 100, acquires data from inside of the predictor creation device 100, and outputs the data as output data 205 via the output device 104 or the communication IF 105 of the predictor creation device 100.

The data acquisition unit 210 takes in the input data 201 given by a user, and outputs a result processed by the predictor creation device 100 based on the input data 201 as the output data 205. The input data 201 includes generation setting information 212 related to generation of a predictor and calibration setting information 213 related to calibration of the predictor. The generation setting information 212 is output to the predictor acquisition unit 220. The calibration setting information 213 is output to the parameter extraction unit 250. The output data 205 includes information related to a state of the predictor and information related to an analysis result, which are generated based on management information 241 sent from the data management unit 240.

The predictor acquisition unit 220 determines a machine learning parameter for generating a predictor based on the generation setting information 212 from the data acquisition unit 210, and generates a plurality of predictors using the training data set 202. The predictor acquisition unit 220 may read a plurality of predictors from outside via the communication IF 105. The predictor is, for example, a neural network or a decision tree in which the machine learning parameter is set. In order to distinguish a predictor from an ensemble predictor to be described later, a predictor which is not an ensemble may be referred to as a "single predictor".

The predictor acquisition unit 220 generates an ensemble predictor by averaging a plurality of single predictors. The predictor acquisition unit 220 may read an ensemble predictor from outside via the communication IF 105. Since the ensemble predictor is not calibrated by the predictor calibration unit 260, the ensemble predictor is referred to as a basic ensemble predictor. The basic ensemble predictor is an ensemble predictor in which output layers of a plurality of single predictors are combined, and a combination coefficient of each single predictor has the same value. For example, when the number of the plurality of single predictors is 100, a combination coefficient of each single predictor is 0.01. The plurality of single predictors and the basic ensemble predictor are collectively referred to as a predictor group.

The predictor acquisition unit 220 outputs a combination of a machine learning parameter (including a combination coefficient for the basic ensemble predictor) for each predictor in the predictor group and a neural network (or decision tree) as predictor information 221 to the predictor analysis unit 230 and the data management unit 240. The predictor acquisition unit 220 stores the training data set 202 in the data management unit 240.

The predictor analysis unit 230 uses the training data set 202 and a test data set 203 to analyze a prediction accuracy characteristic and a prediction basis characteristic of a predictor. The training data set 202 is a combination of training data (containing a plurality of features) input to the predictor and ground truth data corresponding to the training data, for each sample. The test data set 203 is a combination of test data input to the predictor and ground truth data corresponding to the test data, for each sample. The predictor to be analyzed by the predictor analysis unit 230 is acquired as the predictor information 221 from the predictor acquisition unit 220 or calibrated predictor information 261 from the predictor calibration unit 260.

The prediction accuracy characteristic of the predictor is, for example, an accuracy score obtained by comparing a predicted value output from the predictor when the test data is applied to the predictor with the ground truth data corresponding to the test data. More specifically, for example, the accuracy score is a root mean square error (also referred to as RMSE) for a regression problem, and is an accuracy rate for a classification problem. In addition, the predictor analysis unit 230 may create a scatter diagram in which the predicted value made by the predictor and the ground truth data are set on a vertical axis and a horizontal axis, respectively, and analyze the prediction accuracy characteristic.

The prediction basis characteristic of the predictor is, for example, an explanation score (also referred to as contribution) of each feature with respect to a predicted value output from the predictor when the training data is applied to the predictor, and is analyzed by creating plots from various viewpoints.

More specifically, for example, the explanation score is a Shapley value. As a plot for analyzing the prediction basis characteristic, there is a plot showing, with respect to a predicted value obtained when training data of a certain sample is applied to the predictor, how much explanation score (contribution) of each feature in the sample is to be displayed in a bar graph (refer to as an explanation graph in Embodiment 1, see FIG. 10). The explanation graph is called local explanation for prediction.

As another plot, there is a partial dependence plot (hereinafter, referred to as PDP) for analyzing a tendency of how each feature in all samples contributes to a predicted value group obtained when training data of all samples is applied to a predictor. PDP is obtained by setting any feature on a horizontal axis, setting an explanation score (contribution) of the feature on a vertical axis, and plotting a relationship between the set feature and the explanation score for all samples of the training data. PDP is called global explanation for prediction.

The predictor analysis unit 230 stores analysis result information 231 obtained by analyzing the predictor in the data management unit 240. The predictor analysis unit 230 refers to an allowable prediction error and an allowable explanation error in extraction parameter information 251 sent from the parameter extraction unit 250, and evaluates whether an accuracy score and an explanation score of a calibrated predictor in the calibrated predictor information 261 achieve desired characteristics. Here, an evaluation result related to the accuracy score is in the analysis result information 231 as a part of an analysis result related to the prediction accuracy characteristic. An evaluation result related to the explanation score is in the analysis result information 231 as a part of an analysis result related to the prediction basis characteristic.

The data management unit 240 acquires the training data set 202, the predictor information 221 from the predictor acquisition unit 220, the analysis result information 231 from the predictor analysis unit 230, the extraction parameter information 251 from the parameter extraction unit 250, and the calibrated predictor information 261 from the predictor calibration unit 260, and outputs necessary information as the management information 241 to the data acquisition unit 210. The data management unit 240 outputs management target predictor information 242 to the predictor calibration unit 260.

The parameter extraction unit 250 extracts, from the calibration setting information 213 sent from the data acquisition unit 210, a parameter related to predictor calibration, such as constraint information for the prediction basis characteristic. The extracted parameter is output as the extraction parameter information 251 to the predictor analysis unit 230, the data management unit 240, and the predictor calibration unit 260.

Based on the extraction parameter information 251 from the parameter extraction unit 250 and the management target predictor information 242 from the data management unit 240, the predictor calibration unit 260 determines combination coefficients for a plurality of predictors such that the combination coefficients approach a desired prediction basis characteristic, and creates a new predictor by linearly combining the combination coefficients.

Such a method of creating a new predictor by combining a plurality of predictors is called an ensemble method. The predictor calibration unit 260 outputs a combination of the machine learning parameter, the neural network (or the decision tree), and the combination coefficient constituting the predictor (referred to as an ensemble predictor) created by the ensemble method as the calibrated predictor information 261 to the predictor analysis unit 230 and the data management unit 240. The calibrated predictor information 261 can also be output to outside of the predictor creation device 100 as a calibrated predictor.

<Management Information>

Next, the management information 241 managed by the data management unit 240 will be described with reference to FIGS. 3 and 4.

Figure 3:
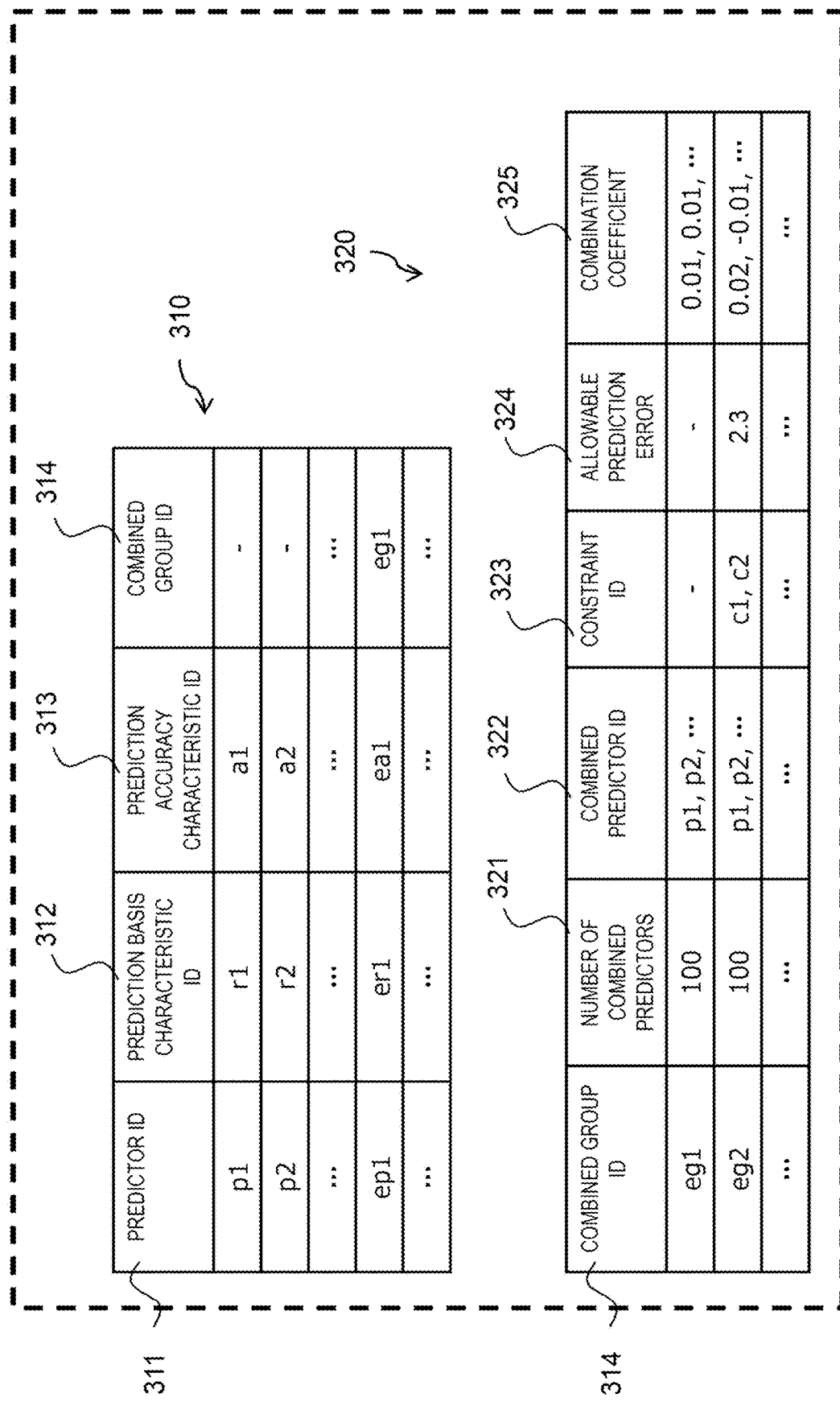
FIG. 3 is a diagram showing an example of management information according to Embodiment 1.

FIG. 3 is a diagram showing an example of the management information 241 according to Embodiment 1. The management information 241 is held by the data management unit 240. The management information 241 associates the predictor information 221, the analysis result information 231, the extraction parameter information 251, and the calibrated predictor information 261 in the data management unit 240.

Specifically, for example, the management information 241 includes predictor management information 310 and ensemble management information 320. The predictor management information 310 is information which associates the predictor information 221 with the analysis result information 231. The ensemble management information 320 is information which associates the extraction parameter information 251 with the calibrated predictor information 261.

The predictor management information 310 includes, as fields, a predictor ID 311, a prediction basis characteristic ID 312, a prediction accuracy characteristic ID 313, and a combined group ID 314. A combination of values in fields in the same row is an entry which defines a characteristic of the predictor.

The predictor ID 311 is identification information for uniquely specifying a single predictor acquired by the predictor acquisition unit 220 (hereinafter, also referred to as a single predictor) or a calibrated predictor created by the predictor calibration unit 260 (that is, an ensemble predictor).

In Embodiment 1, values in the predictor ID 311 for the single predictor are "p1", "p2", . . . , and values in the predictor ID 311 for the ensemble predictor are "ep1", "ep2", . . . . Hereinafter, "e" is added to a head of information related to the ensemble predictor, not limited to the value in the predictor ID 311 for the ensemble predictor.

The prediction basis characteristic ID 312 is identification information for uniquely specifying an analysis result related to the prediction basis characteristic of each predictor input as the analysis result information 231. In Embodiment 1, the prediction basis characteristic ID 312 for prediction basis characteristics (for example, an explanation score for each feature) of the single predictor and the ensemble predictor is "r1", "r2", . . . , and "er1", "er2", . . . .

The prediction accuracy characteristic ID 313 is identification information for uniquely specifying an analysis result related to a prediction accuracy characteristic of each predictor input as the analysis result information 231. In the present embodiment, the prediction accuracy characteristic ID 313 for prediction accuracy characteristics (for example, accuracy scores) of the single predictor and the ensemble predictor is "a1", "a2", . . . , and "ea1", "ea2", . . . .

The combined group ID 314 is identification information for uniquely specifying a combined group which is a predictor group combined as an ensemble predictor. The combined group ID 314 is assigned to the predictor ID 311 for the ensemble predictor.

The ensemble management information 320 includes, as fields, a combined group ID 314, the number of combined predictors 321, a combined predictor ID 322, a constraint ID 323, an allowable prediction error 324, and a combination coefficient 325. A combination of values in fields in the same row is an entry which defines a characteristic of an ensemble predictor.

The number of combined predictors 321 is the number of single predictors combined by ensemble. The combined predictor ID 322 is a list of values of predictors ID 311 for the single predictor combined by the ensemble.

The constraint ID 323 is identification information for uniquely specifying a constraint. The constraint is a condition set such that the prediction basis characteristic of the ensemble predictor approaches a prediction basis characteristic expected by the user (also referred to as an expected prediction basis characteristic). The constraint ID 323 is in a calibration parameter information table 400 (to be described later in FIG. 4).

The allowable prediction error 324 is information indicating an accuracy score to be achieved by an ensemble predictor. A root mean square error (RMSE) is applied as the accuracy score for a regression problem, and an accuracy rate is applied as the accuracy score for a classification problem. The combination coefficient 325 is a coefficient assigned to each of the predictors used for ensemble.

<Calibration Parameter Information Table>

FIG. 4 is a diagram of an example of a calibration parameter information table according to Embodiment 1. The calibration parameter information table 400 is constraint information for calibrating a predictor, and is registered in the data management unit 240 by screen input in FIGS. 8 and 9 to be described later. Specifically, the calibration parameter information table 400 includes, for example, a quantitative constraint information table 410, a qualitative constraint information table 420, and a constraint parameter information table 430.

The quantitative constraint information table 410 includes quantitative constraint information for calibrating a basis characteristic of the predictor, and includes, for example, a quantitative constraint ID 411, a sample ID 412, and expected explanation score information 413 as fields.

The quantitative constraint ID 411 is identification information for uniquely specifying quantitative constraint information 401, 402, 403, . . . . That is, each column for values "c1", "c2", "c3", . . . of the quantitative constraint ID 411 arranged in a row direction indicates the quantitative constraint information 401, 402, 403, . . . .

The sample ID 412 is identification information for uniquely specifying each sample in the training data set 202. In Embodiment 1, "s1", "s2", . . . shown in a column of the sample ID 412 are values of the sample ID 412.

The expected explanation score information 413 is a column of desired explanation scores (that is, expected explanation scores) of features with respect to a prediction result of an ensemble predictor for each sample specified by the sample ID 412, which is arranged in a column direction of each feature in a feature group (for example, if the sample is a subject, feature 1 is height, feature 2 is weight, feature 3 is blood glucose level, . . . ) in the training data arranged in the row direction. Each score in the expected explanation score information 413 is given with a real value or no setting (expressed as "–" in the present embodiment).

For example, the quantitative constraint information 401 specified by a value "c1" in the quantitative constraint ID 411 is information having an expected value score column (0.0, 7.2, . . . ) for each sample for "feature 1". The quantitative constraint information 402 specified by a value "c2" in the quantitative constraint ID 411 is information having an expected value score column (–(no setting), –2.2, . . . ) for each sample for "feature 2". The quantitative constraint information 403 specified by a value "c3" in the quantitative constraint ID 411 is information having an expected value score column (–(no setting), –(no setting), . . . ) for each sample for "feature 3".

Specifically, for example, the quantitative constraint information 401, 402, 403, . . . are set by a user operation in a quantitative expected characteristic setting screen 800 in FIG. 8 to be described later.

The qualitative constraint information table 420 includes qualitative constraint information for calibrating a basis characteristic of the predictor, and includes, for example, a qualitative constraint ID 421, a sample ID 412, and expected qualitative characteristic information 422 as fields. The qualitative constraint ID 421 is identification information for uniquely specifying qualitative constraint information 441 to 444. That is, each column of values "d1", "d2", "d3", and "d4" in the qualitative constraint ID 421 arranged in the row direction indicates the qualitative constraint information 441 to 444.

The expected qualitative characteristic information 422 is information indicating an expected characteristic (that is, expected qualitative characteristic) for each of the qualitative constraint information 441 to 444. Specifically, for example, a "maximum explanation score", a "minimum explanation score", "monotonicity+", and "monotonicity-" are arranged in the row direction as values in the expected qualitative characteristic information 422, and features which are values of expected characteristics for each sample are defined in a column direction of the "maximum explanation score", the "minimum explanation score", the "monotonicity+", and the "monotonicity-".

The qualitative constraint information 441 is an expected qualitative characteristic indicating a qualitative constraint on a "maximum explanation score" as the prediction basis characteristic. Specifically, for example, the qualitative constraint information 441 is a qualitative constraint that an explanation score of "feature 2" is maximum for training data having the sample ID 412 of "s1", and an explanation score of "feature 1" is maximum for training data having the sample ID 412 of "s2".

Similarly, the qualitative constraint information 442 is an expected qualitative characteristic indicating a qualitative constraint on a "minimum explanation score" as the prediction basis characteristic. Specifically, for example, the qualitative constraint information 442 is a qualitative constraint that an explanation score of "feature 3" is minimum for training data having the sample ID 412 of "s1" and no constraint is set for training data having the sample ID 412 of "s2".

The qualitative constraint information 443 is an expected qualitative characteristic indicating a qualitative constraint on the "monotonicity+" (which means positive monotonicity) as the prediction basis characteristic. Specifically, for example, the qualitative constraint information 443 is a qualitative constraint that the larger a value of "feature 1" is, the larger the explanation score is for the training data having the sample ID 412 of "s1" and "s2".

Similarly, the qualitative constraint information 444 is an expected qualitative characteristic indicating a qualitative constraint on the "monotonicity-" (which means negative monotonicity) as the prediction basis characteristic. Specifically, for example, the qualitative constraint information 444 is a qualitative constraint that no constraint is set for the training data having the sample ID 412 of "s1", and for training data having the sample ID 412 of "s2", the smaller a value of "feature 4" is, the smaller an explanation score is.

Specifically, for example, the qualitative constraint information 441 to 444 are set by a user operation in a qualitative expected characteristic setting screen 900 in FIG. 9 to be described later.

The constraint parameter information table 430 includes information indicating auxiliary parameters for each constraint, and includes, for example, a constraint ID 323, a weight 432, and an allowable explanation error 433 as fields.

The constraint ID 323 includes the quantitative constraint ID 411 and the qualitative constraint ID 421. The weight 432 indicates importance of each piece of constraint information specified by the constraint ID 323. As a value of the weight 432 is larger, the constraint information is more likely to be satisfied in the ensemble predictor which is a calibrated predictor.

The allowable explanation error 433 is information indicating a characteristic of an explanation score to be achieved by an ensemble predictor. In the quantitative constraint information, an explanation score for training data of a predictor and a root mean square error (RMSE) of an expected explanation score thereof are applied as indexes. In the qualitative constraint information, the number of samples in which a qualitative characteristic of an explanation score of a predictor for training data does not satisfy an expected qualitative characteristic is applied as an index.

Specifically, the weight 432 and the allowable explanation error 433 are set by a user operation in the qualitative expected characteristic setting screen 900 in FIG. 9 to be described later.

Example of Setting Screen

Figure 5:
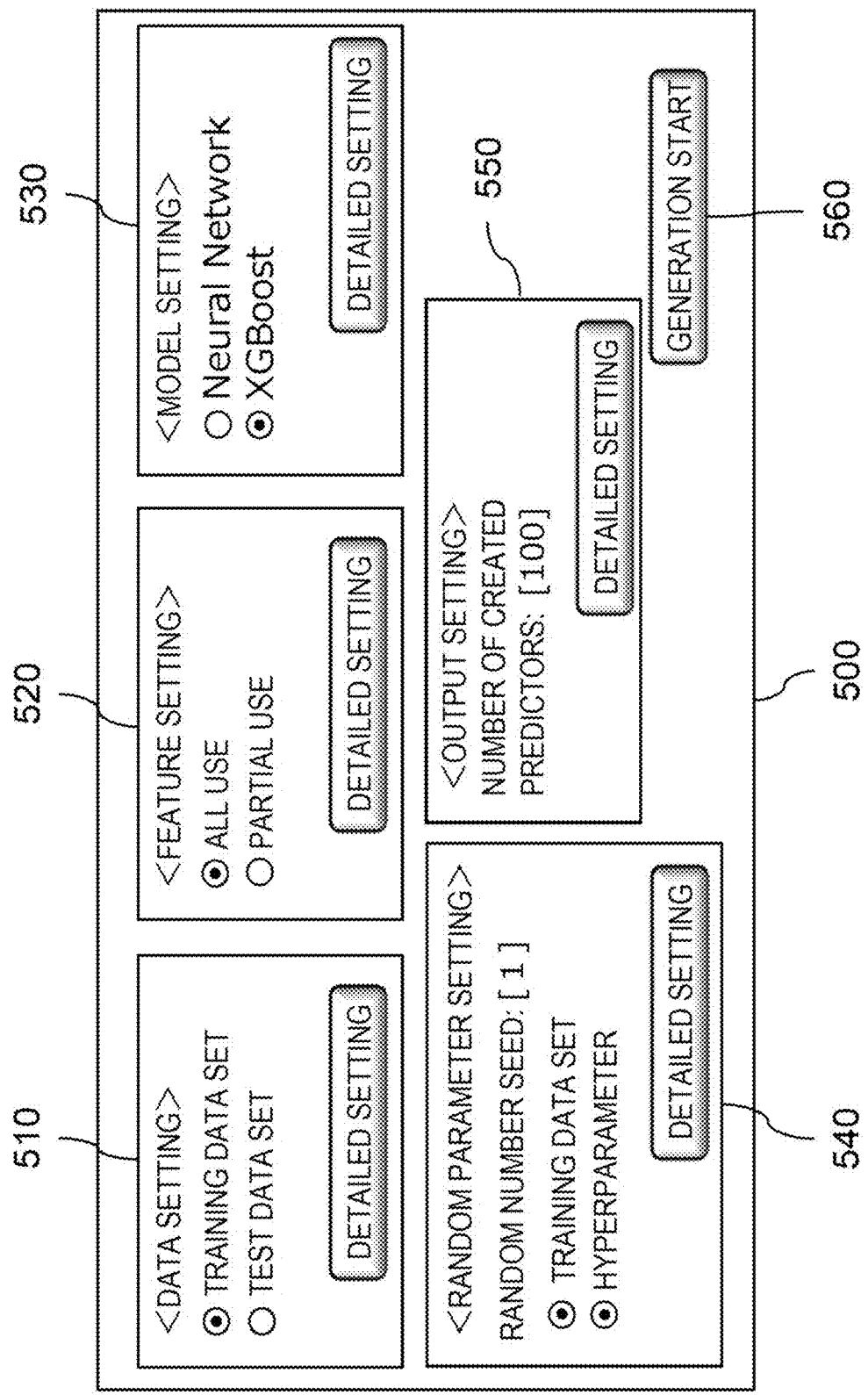
FIG. 5 is a diagram showing an example of a setting screen according to Embodiment 1.

FIG. 5 is a diagram showing an example of a setting screen according to Embodiment 1. The setting screen 500 is displayed on a display serving as the output device 104. The setting screen 500 is a screen for the user to set the generation setting information 212. The setting screen 500 includes a data setting area 510, a feature setting area 520, a model setting area 530, a random parameter setting area 540, an output setting area 550, and a generation start button 560.

The data setting area 510 is an area in which either the training data set 202 or the test data set 203 used by the predictor creation device 100 to create a predictor is designated by radio buttons. A file read as the training data set 202 may be the same as or different from a file read as the test data set 203. In a case of the same file, when the training data set 202 is designated, the predictor creation device 100, for example, may read 80% of data in the file as the training data set 202, and when the test data set 203 is designated, the predictor creation device 100 may read the remaining 20% of data in the file as the test data set 203.

The feature setting area 520 is an area in which a feature input to the predictor as training data or test data and an objective variable to be predicted (that is, ground truth data) are designated by radio buttons. For example, when "all use" is designated, all features in the training data or the test data in a data set designated in the data setting area 510 are read. When "partial use" is designated, a part of features of the training data or the test data in the data set designated in the data setting area 510 are read. A part of features are set in advance and can be freely changed by the user.

The model setting area 530 is an area in which a type of a machine learning model which is a base of a predictor to be created is selected by radio buttons. In FIG. 5, as an example, one or more types can be selected from "Neural Network" and "XGBoost".

The random parameter setting area 540 is an area for setting parameters for giving perturbation to create predictors having different characteristics. FIG. 5 shows an example in which perturbation is given to both the training data set 202 and a hyperparameter of the machine learning model. As an example of a method of giving perturbation, the predictor creation device 100 creates a different training data set 202 for each predictor to be created by random sampling allowing duplication for the training data set 202, and applies the training data set 202 to the machine learning model. For the hyperparameter, the predictor creation device 100 sets an initial state of hyperparameter search to a random value. In this example, "1" indicating a specific random number generation pattern is set as a random number seed.

The output setting area 550 is an area for setting output parameters of a predictor acquired by the predictor acquisition unit 220. In the example in FIG. 5, setting of creating 100 predictors is made. When a plurality of machine learning models are selected in the model setting area 530, the "number of created predictors" can be set for each machine learning model.

When the generation start button 560 is pressed by the user, the predictor creation device 100 starts generating a predictor according to the generation setting information 212 set in the data setting area 510, the feature setting area 520, the model setting area 530, the random parameter setting area 540, and the output setting area 550.

Example of Predictor Creation Processing Procedure

Figure 6:
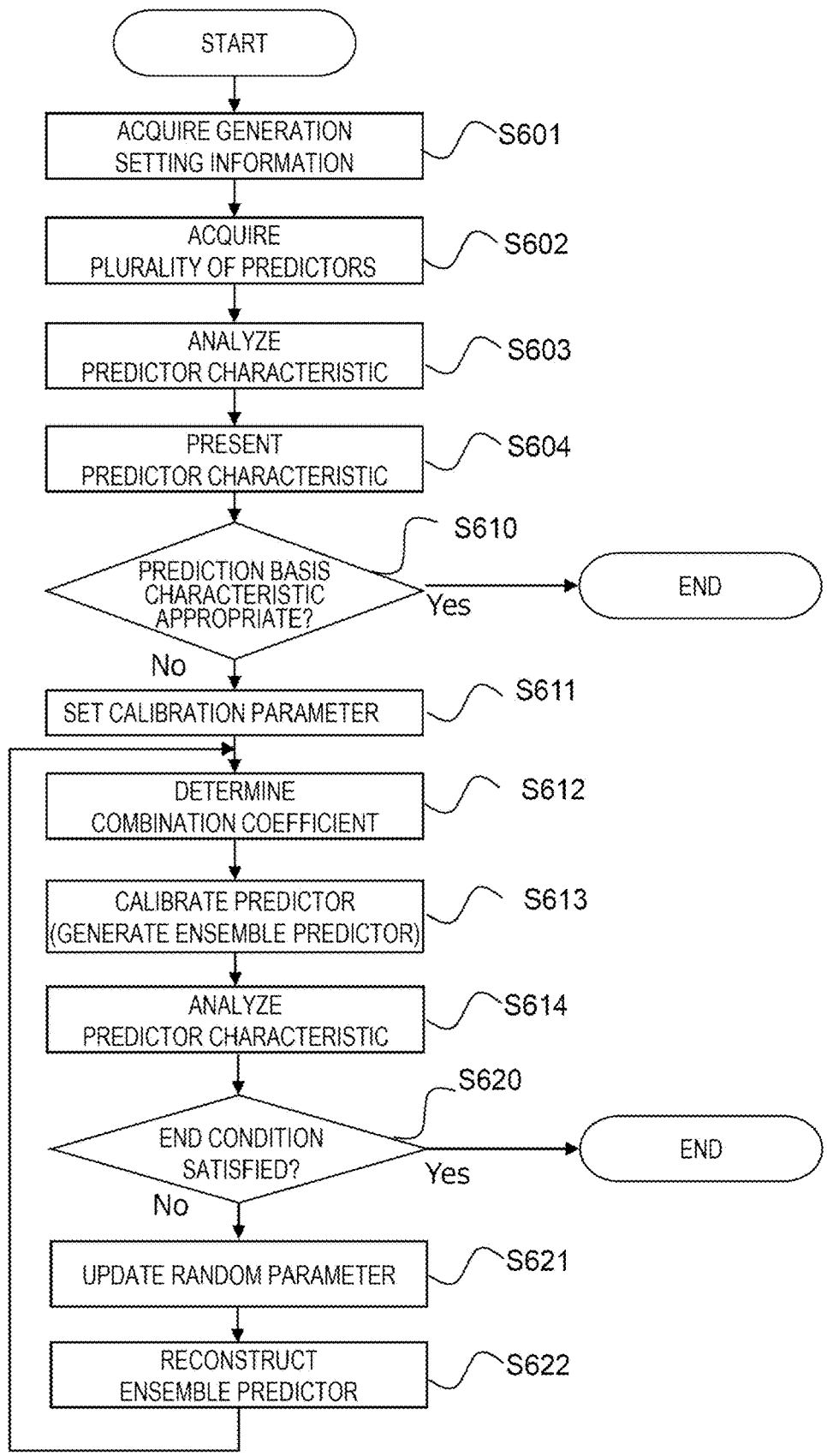
FIG. 6 is a flowchart showing an example of a predictor creation processing procedure performed by the predictor creation device according to Embodiment 1.

FIG. 6 is a flowchart showing an example of a predictor creation processing procedure performed by the predictor creation device 100 according to Embodiment 1. The predictor creation device 100 acquires the generation setting information 212 set in the setting screen 500 shown in FIG. 5 by pressing the generation start button 560 (step S601).

Next, the predictor creation device 100 acquires a plurality of (100 in the example of the output setting area 550) predictors by the predictor acquisition unit 220 based on the generation setting information 212 (step S602). In step S602, the predictor creation device 100 acquires a basic ensemble predictor (a value of the predictor ID 311 is "ep1", a value of the combined group ID 314 is "eg1", and the combination coefficient 325 is "0.01") obtained by averaging a plurality of created predictors (100 predictors in the example of the output setting area 550) as a calibration target ensemble predictor. The predictor acquisition unit 220 outputs, to the predictor analysis unit 230 and the data management unit 240, the predictor information 221 (including the combination coefficient 325 for the basic ensemble predictor) for a predictor group which is a plurality of acquired single predictors and the basic ensemble predictor.

Next, the predictor creation device 100 executes, by the predictor analysis unit 230, characteristic analysis processing on each predictor in the predictor group created in step S602 (step S603). Specifically, for example, the predictor analysis unit 230 calculates an accuracy score such as a root mean square error (RMSE) for the test data set 203 and an explanation score for each feature such as a Shapley value for the training data set 202 as the analysis result information 231 for each predictor (including the basic ensemble predictor) in the predictor group. The predictor analysis unit 230 may acquire the analysis result information 231 from outside.

The predictor analysis unit 230 stores analysis result information 231 in the data management unit 240. Accordingly, the data management unit 240 stores, for each predictor ID 311, an accuracy score in association with the prediction accuracy characteristic ID 313 as the prediction accuracy characteristic, and an explanation score for each feature in association with the prediction basis characteristic ID 312 as the prediction basis characteristic, in the storage device 102.

Next, the predictor creation device 100 presents, via the data acquisition unit 210, the analysis result information 231 in step S603 to the user (step S604). The data acquisition unit 210 acquires the predictor management information 310 and the ensemble management information 320 as the management information 241 from the data management unit 240, and outputs a displayable presentation screen showing the prediction accuracy characteristic and the prediction basis characteristic of the predictor.

Figure 7:
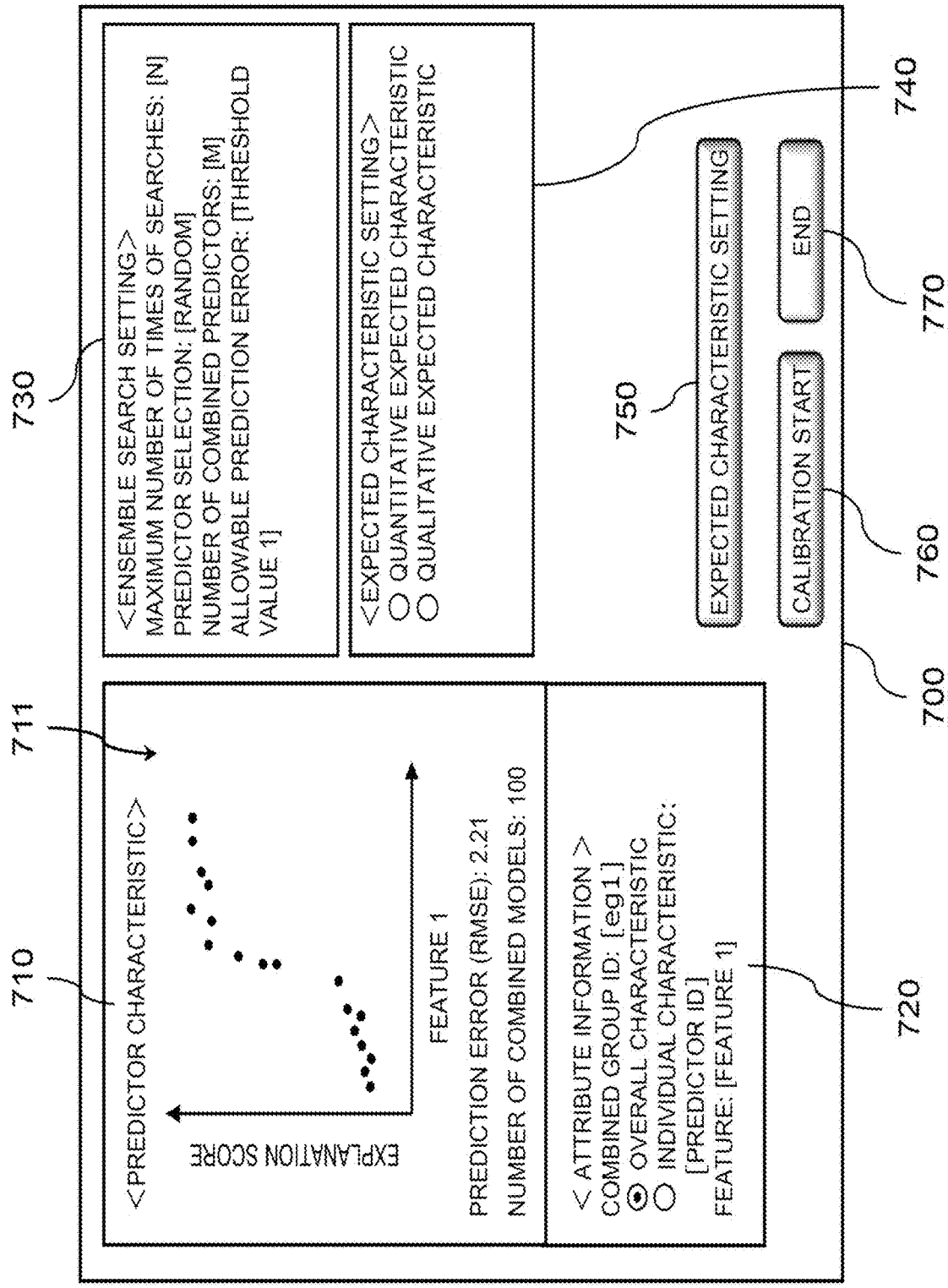
FIG. 7 is a diagram showing an example of a presentation screen of analysis result information according to Embodiment 1.

FIG. 7 is a diagram showing an example of a presentation screen of the analysis result information 231 according to Embodiment 1. A presentation screen 700 is displayed on a display serving as the output device 104. The presentation screen 700 includes a predictor characteristic presentation area 710, an attribute information selection area 720, an ensemble search setting area 730, an expected characteristic setting area 740, an expected characteristic setting button 750, a calibration start button 760, and an end button 770.

The predictor characteristic presentation area 710 is an area for presenting the characteristic of the predictor to the user. FIG. 7 shows an example in which PDP 711, a "prediction error (RMSE)" of the predictor as the prediction accuracy characteristic, and the "number of combined models" are presented. The PDP 711 shown in FIG. 7 is a graph visualizing a tendency of an explanation score for "feature 1" as the prediction basis characteristic. For which feature the PDP 711 is displayed can be selected in the attribute information selection area 720.

The attribute information selection area 720 is an area in which a predictor and attribute information thereof presented in the predictor characteristic presentation area 710 can be selected. FIG. 7 shows an example in which a basic ensemble predictor (a value of the combined group ID 314 is "eg1") and the feature 1 thereof are selected. In the attribute information selection area 720, an "overall characteristic" is a selection item for presenting a characteristic of the ensemble predictor.

In the attribute information selection area 720, an "individual characteristic" is a selection item for presenting a characteristic of the single predictor in the ensemble predictor. A characteristic of a desired single predictor is presented by designating the predictor ID 311 in the "individual characteristic". When a plurality of predictor IDs 311 are designated in the "individual characteristic", a characteristic of an ensemble predictor is presented, in consideration of a combination coefficient for the designated single predictors.

In FIG. 7, since a "combined group ID" is "eg1" and the "overall characteristic" is selected in the attribute information selection area 720, explanation scores plotted in the PDP 711 in the predictor characteristic presentation area 710 are values (explanation scores) of prediction basis characteristics specified by the prediction basis characteristic ID 312 (r1, r2, . . . , r100) of 100 predictors (p1, p2, . . . , p100) constituting the basic ensemble predictor (eg1).

The ensemble search setting area 730 is an area for setting a parameter for searching for a better ensemble predictor. In the ensemble search setting area 730, the "maximum number of times of searches" is a parameter for setting maximum number of times additional creation of the predictor by the predictor acquisition unit 220 is repeated when an ensemble predictor created by the predictor calibration unit 260 does not satisfy a desired characteristic. In FIG. 7, N times (N is an integer of 1 or more) are set.

Every time a predictor is additionally created, the number of single predictors increases. Although all predictors can be used, there is a case where the number of predictors used for ensemble is desired to be limited. "Predictor selection" in the ensemble search setting area 730 is a setting item for selecting a sampling method of the predictor in such a case. In FIG. 7, "random" is selected as the "predictor selection", but various sampling methods such as "descending order of accuracy of single predictors" and "use of all predictors" can be set.

In the ensemble search setting area 730, the "number of combined predictors" is an item for setting the number of predictors to be extracted by the sampling method set in the "predictor selection". When "use of all predictors" is selected in the "predictor selection", no input is necessary. In FIG. 7, M pieces (M is an integer of 1 or more) are set.

In the ensemble search setting area 730, an "allowable prediction error" is an accuracy score to be achieved by an ensemble predictor, and can also be expressed as a lower limit value or a target value of the accuracy score. A value of the input "allowable prediction error" here is later managed by the data management unit 240 as the allowable prediction error 324. In Embodiment 1, an example in which the "allowable prediction error" is expressed and set as "threshold value 1" is shown.

The expected characteristic setting area 740 is an area for setting an expected prediction basis characteristic in a predictor created (or calibrated) by the predictor calibration unit 260. In the expected characteristic setting area 740, either a quantitative expected characteristic (quantitative characteristic) or a qualitative expected characteristic (qualitative characteristic) can be selected.

Figure 10:
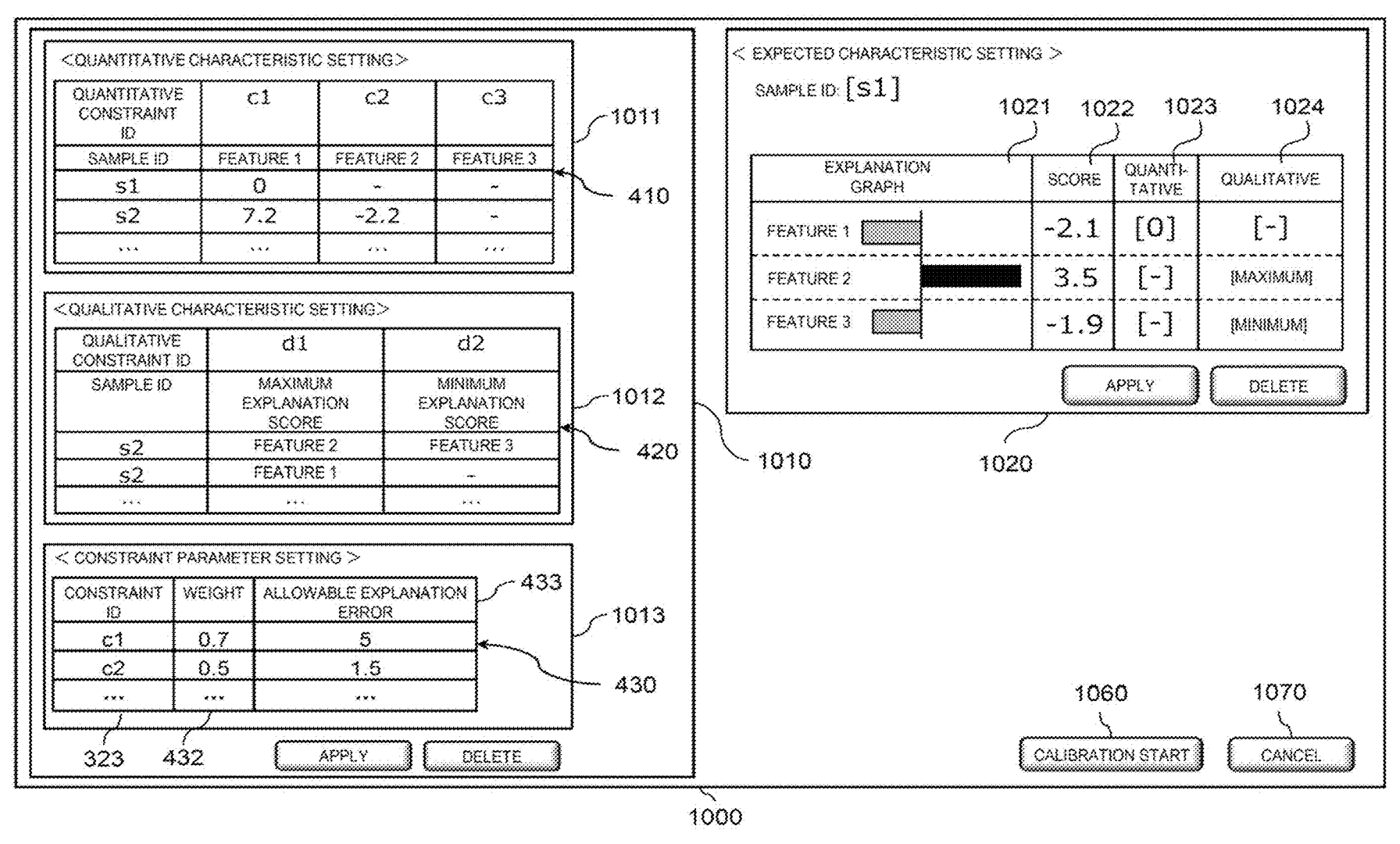

The expected characteristic setting button 750 is a button for setting an expected characteristic. When the expected characteristic setting button 750 is pressed, a data expected characteristic setting screen shown in FIG. 10 is displayed. The calibration start button 760 is a button for starting calibration with contents set on the presentation screen 700. The end button 770 is a button for ending predictor creation processing and outputting the predictor information 221 (or a machine learning parameter) for the predictor group.

Referring back to FIG. 6, the predictor creation device 100 waits for the data acquisition unit 210 to input, to the presentation screen 700, whether the prediction basis characteristic (explanation score) is appropriate as a result of presenting the presentation screen 700 to the user in step S604 (step S610). When the data acquisition unit 210 acquires, from the presentation screen 700, an input indicating that the prediction basis characteristic (explanation score) is appropriate (step S610: Yes), for example, when the end button 770 is pressed, the predictor creation device 100 outputs the predictor information 221 (or the machine learning parameter) for the predictor group, and ends the series of processing.

On the other hand, when the data acquisition unit 210 acquires from the presentation screen an input indicating that the prediction basis characteristic (explanation score) is not appropriate (step S610: No), for example, when the calibration start button 760 is pressed, the processing proceeds to step S611. In this case, the predictor creation device 100 sets a parameter for calibrating a current predictor to a desired prediction basis characteristic.

As a method of calibrating the prediction basis characteristic in Embodiment 1, the user can select, on the presentation screen 700, one of setting of the quantitative expected characteristic and setting of the qualitative expected characteristic from the presentation screen 700. Therefore, when a "quantitative expected characteristic" is selected in the expected characteristic setting area 740, the quantitative expected characteristic setting screen 800 shown in FIG. 8 is displayed in step S611, and when a "qualitative expected characteristic" is selected, the qualitative expected characteristic setting screen 900 shown in FIG. 9 is displayed in step S611.

Figure 8:
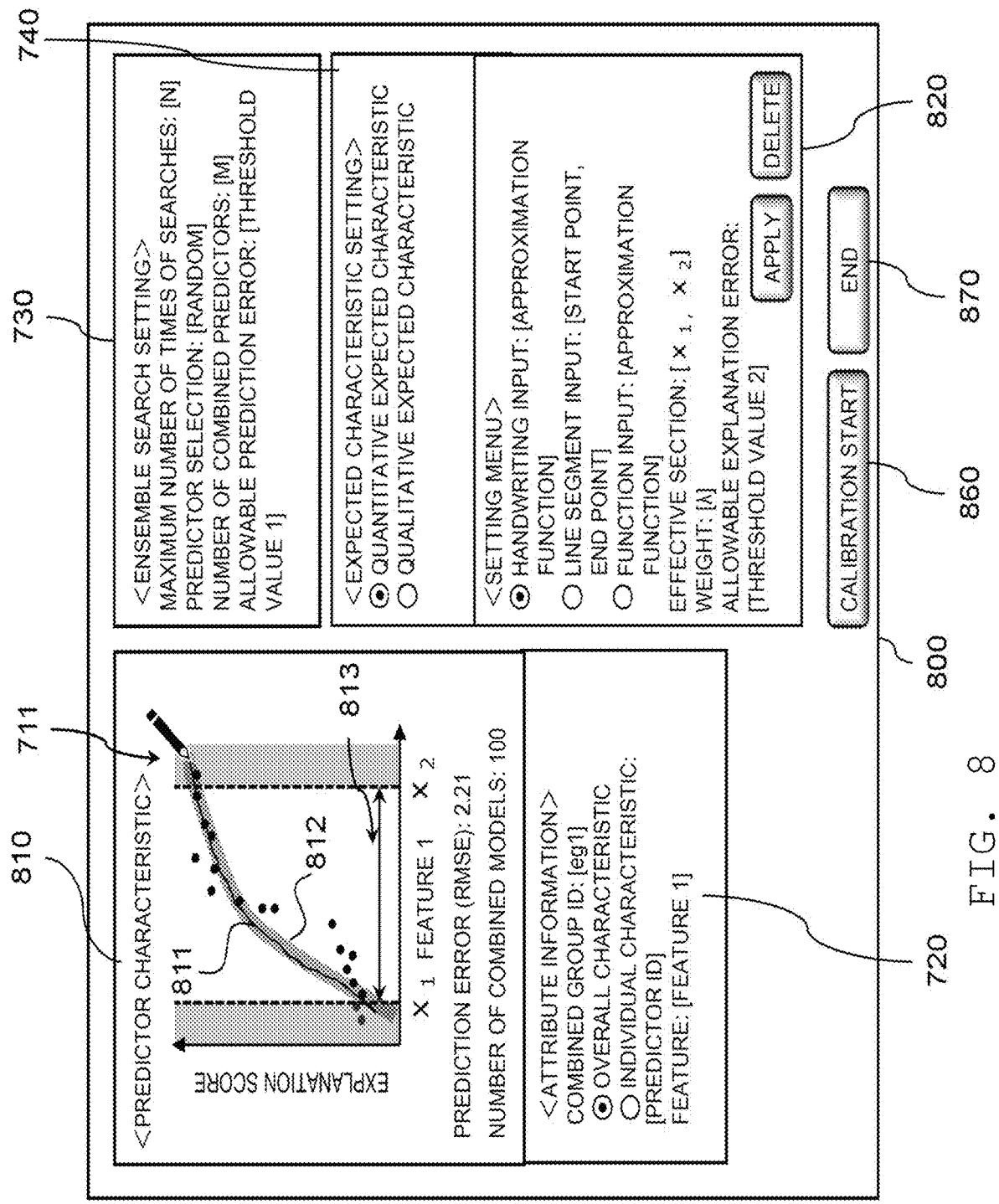
FIG. 8 is a diagram showing an example of a quantitative expected characteristic setting screen according to Embodiment 1.

FIG. 8 is a diagram showing an example of the quantitative expected characteristic setting screen 800 according to Embodiment 1. The quantitative expected characteristic setting screen 800 includes a predictor characteristic presentation area 810, the attribute information selection area 720, the ensemble search setting area 730, the expected characteristic setting area 740, a quantitative expected characteristic setting area 820, a calibration start button 860, and an end button 870.

The predictor characteristic presentation area 810 is an area for presenting a graph indicating a quantitative predictor characteristic. In FIG. 8, curves 811 and 812 and an effective section 813 are displayed in the PDP 711 in the predictor characteristic presentation area 810.

The quantitative expected characteristic setting area 820 is an area for setting a quantitative expected characteristic for the prediction basis characteristic. As a method for giving a quantitative characteristic, "handwriting input", "line segment input", or "function input" can be selected. FIG. 8 shows an example in which the "handwriting input" is selected. When the "handwriting input" is selected, the user can directly input the curve 811 of an expected prediction basis characteristic to the PDP 711 in the predictor characteristic presentation area 810 via the input device 103 such as a mouse or a touch pen. By selecting a model of "approximation function" in the quantitative expected characteristic setting area 820, the curve 812 approximated by a function so as to fit the input curve 811 is obtained and displayed in the PDP 711 in the predictor characteristic presentation area 810.

When the "line segment input" is selected, by setting a start point and an end point of a line segment, the line segment can be reflected and displayed in the PDP 711 in the predictor characteristic presentation area 810. The data acquisition unit 210 may directly set the start point and the end point as real numbers in the quantitative expected characteristic setting area 820 by a user operation, or may designate and take in points in the PDP 711 in the predictor characteristic presentation area 810 with a mouse or a touch pen. The data acquisition unit 210 can input a plurality of line segments by a user operation, and can provide an expected prediction basis characteristic as a curve including a plurality of line segments.

When the "function input" is selected, a model of the "approximation function" is selected in the quantitative expected characteristic setting area 820, so that a curve approximated by the function is obtained so as to fit data displayed in the PDP 711 in the predictor characteristic presentation area 810, and the curve is displayed in the PDP 711 in the predictor characteristic presentation area 810. For example, a linear function or a quadratic function can be selected as the model of the "approximation function".

In the quantitative expected characteristic setting area 820, an "effective section" indicates a section (effective section 813) in which the expected prediction basis characteristic is effective. With respect to a target feature and a characteristic of an explanation score thereof, by setting domain knowledge of an expert only for an area section in which the expert is confident, it is possible to avoid setting an erroneous prediction basis characteristic in an uncertain area section. Therefore, improvement of the prediction accuracy characteristic and the prediction basis characteristic of the ensemble predictor can be promoted. In the quantitative expected characteristic setting area 820, a start point of the "effective section" is denoted by "x1" and an end point of the "effective section" is denoted by "x2".

In the quantitative expected characteristic setting area 820, "weight" is a parameter indicating how strongly a set quantitative characteristic here is considered, and is usually given as a real value larger than zero. In FIG. 8, A is shown. The input "weight" here is managed as the weight 432 of the data management unit 240.

In the quantitative expected characteristic setting area 820, an "allowable explanation error" is a characteristic of an explanation score to be achieved by an ensemble predictor. An index of the "allowable explanation error" is given by calculating RMSE or the like in the "effective section" for an expected explanation score obtained from a curve of the expected prediction basis characteristic and an explanation score of a calibrated ensemble predictor.

Here, the expected explanation score is obtained by calculating an explanation score on the curve 812 of the expected prediction basis characteristic corresponding to a value of each feature in each sample in training data in the parameter extraction unit 250. In FIG. 8, "threshold value 2" is set as the allowable explanation error 433. The input "allowable explanation error" here is managed as the allowable explanation error 433 of the data management unit 240.

The calibration start button 860 is a button for starting calibration with the input data 201 set on the quantitative expected characteristic setting screen 800 by being pressed. That is, the quantitative constraint information 401, 402, 403, . . . , which are the input data 201, are registered in the quantitative constraint information table 410 as a quantitative expected prediction basis characteristic related to a feature, the weight 432 and the allowable explanation error 433 are registered in the constraint parameter information table 430, and the calibration is started. The end button 870 is a button for ending setting on the quantitative expected characteristic setting screen 800 by being pressed.

Figure 9:
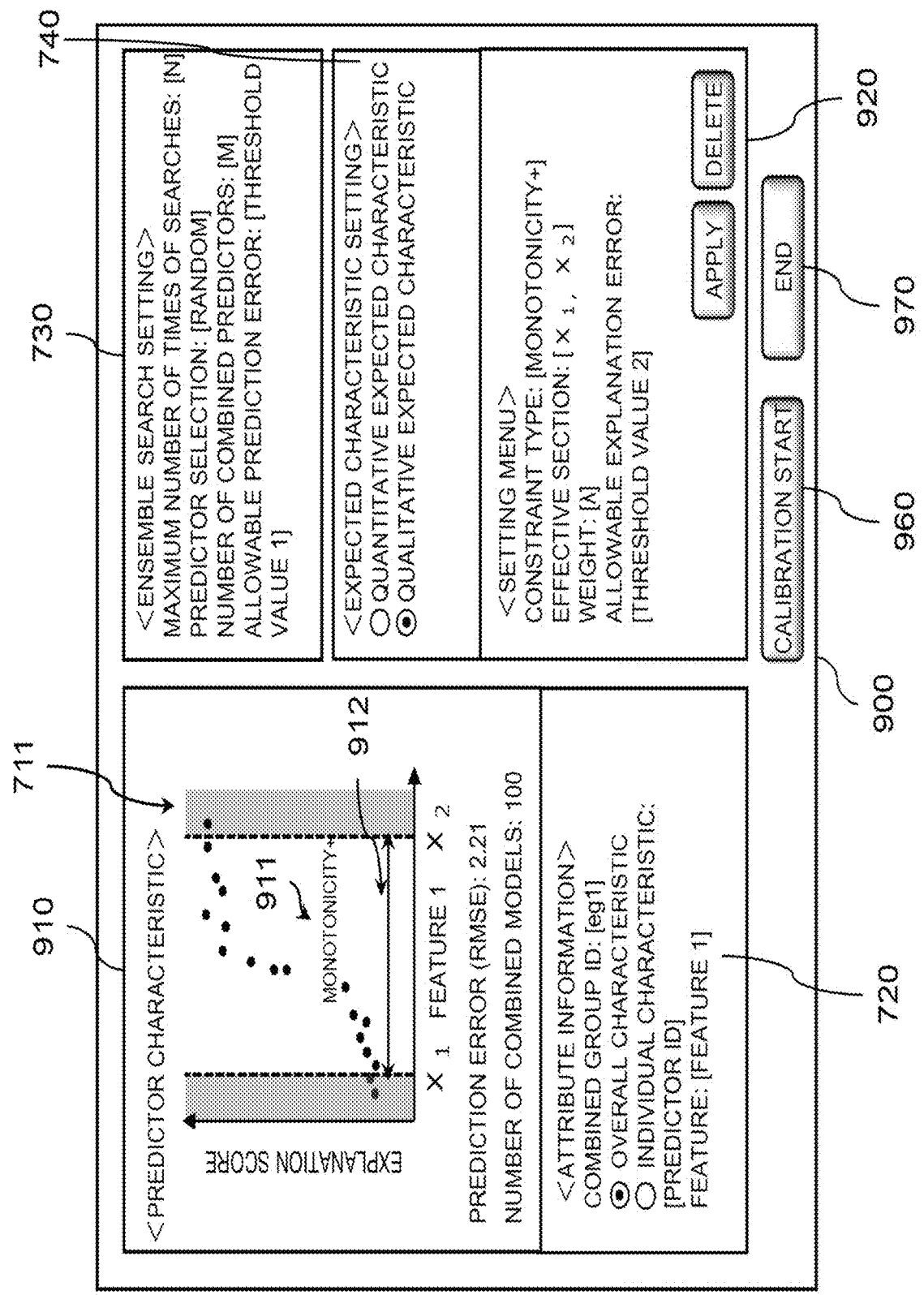
FIG. 9 is a diagram showing an example of a qualitative expected characteristic setting screen according to Embodiment 1.

FIG. 9 is a diagram showing an example of the qualitative expected characteristic setting screen 900 according to Embodiment 1. The qualitative expected characteristic setting screen 900 includes a predictor characteristic presentation area 910, the attribute information selection area 720, the ensemble search setting area 730, the expected characteristic setting area 740, an expected qualitative characteristic setting area 920, a calibration start button 960, and an end button 970.

The predictor characteristic presentation area 910 is an area for presenting a graph indicating a qualitative predictor characteristic. In FIG. 9, in the PDP 711 in the predictor characteristic presentation area 910, a qualitative characteristic such as a constraint type (for example, monotonicity+) 911 and an effective section 912 are displayed.

The expected qualitative characteristic setting area 920 is an area in which a qualitative expected characteristic can be set for a prediction basis characteristic. A "constraint type" indicates a type of a qualitative characteristic to be set. Here, it is possible to set a tendency of an expected prediction basis characteristic such as positive monotonicity (monotonicity+) and negative monotonicity (monotonicity-) for a designated feature with respect to the explanation score. FIG. 9 shows an example in which the positive monotonicity is set as the constraint type 911.

In the expected qualitative characteristic setting area 920, an "allowable explanation error" is a characteristic of an explanation score to be achieved by an ensemble predictor. Since an index of the allowable explanation error in the qualitative characteristic is represented by the number of samples which do not satisfy a set qualitative expected characteristic, the index is obtained by calculating the number of samples which do not satisfy an expected characteristic within a set "effective section".

In the expected qualitative characteristic setting area 920, the "effective section" and "weight" are the same as items of the quantitative expected characteristic setting area 820, and thus description thereof is omitted. Items such as the "constraint type" and the "effective section" set in the expected qualitative characteristic setting area 920 are reflected in the PDP 711 in the predictor characteristic presentation area 910 and visualized. Accordingly, the user can visually understand contents of the set expected characteristic.

The calibration start button 960 is a button for starting calibration with the input data 201 set on the qualitative expected characteristic setting screen 900 by being pressed. That is, the qualitative constraint information 441 to 444, which are the input data 201, are registered in the qualitative constraint information table 420 as a qualitative expected prediction basis characteristic related to a feature, the weight 432 and the allowable explanation error 433 are registered in the constraint parameter information table 430, and the calibration is started. The end button 970 is a button for ending setting on the qualitative expected characteristic setting screen 900 by being pressed.

Referring to FIGS. 8 and 9, when the data acquisition unit 210 receives the input data 201 input to the quantitative expected characteristic setting screen 800 or the qualitative expected characteristic setting screen 900 as the calibration setting information 213, the parameter extraction unit 250 converts the calibration setting information 213 into a data format to be stored in the data management unit 240, and outputs the converted calibration setting information 213 as the extraction parameter information 251.

A unit which sets the expected characteristic in the predictor described above is a unit which sets a general tendency of the prediction basis characteristic, that is, a unit which calibrates the prediction basis characteristic for global explanation. In contrast, there is a case where it is desired to individually set the expected prediction basis characteristic for each sample.

For example, although a tendency of an overall prediction basis characteristic is unknown, it is understood that "when this input value is input, the explanation score of this feature is to be this much" or "the explanation score of this feature is to be larger than the explanation scores of other features" as domain knowledge of an expert. In order to cope with such a case, the predictor creation device 100 has a unit which sets an expected characteristic for each sample. This corresponds to a unit which calibrates a prediction basis characteristic for local explanation. The user can set an expected characteristic for each piece of data through the data expected characteristic setting screen shown in FIG. 10.

FIG. 10 is a diagram showing an example of the data expected characteristic setting screen according to Embodiment 1. A data expected characteristic setting screen 1000 is displayed when the expected characteristic setting button 750 shown in FIG. 7 is pressed in step S604, and the expected characteristic for each piece of data can be set for the predictor in step S611. The data expected characteristic setting screen 1000 includes an overall expected characteristic setting area 1010, a data-unit expected characteristic setting area 1020, a calibration start button 1060, and a cancel button 1070.

The overall expected characteristic setting area 1010 is an area in which an expected characteristic can be set by directly editing the calibration parameter information table 400 shown in FIG. 4. Here, the calibration parameter information table 400 is managed by the data management unit 240 as constraint information rather than the expected prediction basis characteristic. This is because information related to the prediction basis characteristic expected for the user appears as the constraint information to be satisfied for the predictor creation device 100, and there is no difference between the information related to the expected prediction basis characteristic and the constraint information.

Here, an example is shown in which an expected prediction basis characteristic is set for an overall characteristic of the same ensemble predictor (that is, a value of the combined group ID 314 is "eg1") as the predictor used in description of the quantitative expected characteristic setting screen 800 and the qualitative expected characteristic setting screen 900. The overall expected characteristic setting area 1010 includes a quantitative characteristic setting area 1011, a qualitative characteristic setting area 1012, and a constraint parameter setting area 1013.

The quantitative characteristic setting area 1011 is an area in which a quantitative expected characteristic can be set by directly editing the quantitative constraint information table 410. The qualitative characteristic setting area 1012 is an area in which a qualitative expected characteristic can be set by directly editing the qualitative constraint information table 420. The constraint parameter setting area 1013 is an area in which an auxiliary parameter such as the weight 432 and the allowable explanation error 433 for each constraint can be set by directly editing the constraint parameter information table 430.

The data-unit expected characteristic setting area 1020 is an area which can be set by directly editing an expected prediction basis characteristic for each sample, and the expected prediction basis characteristic for a desired sample can be set by designating the sample ID 412. Here, an example is shown in which the expected prediction basis characteristic is set for a sample whose value of the sample ID 412 is "s1".

An explanation graph 1021 is an area which can be presented as a graph (a bar graph in FIG. 10) visually expressing an explanation score (score 1022) of each feature in the sample designated by the sample ID 412. The score 1022 is an area in which the explanation score of each feature in the sample designated by the sample ID 412 can be presented as a numerical value.

Quantitative 1023 is an area in which a quantitative expected characteristic can be set. Here, an example is shown in which an expected explanation score for "feature 1" is set to "0", and expected explanation scores for "feature 2" and "feature 3" are set to "–" (not set). A column of the quantitative 1023 corresponds to setting of an expected characteristic for a row in which a value of the sample ID 412 is "s1" in the quantitative constraint information table 410 of the quantitative characteristic setting area 1011.

Qualitative 1024 is an area in which a qualitative expected characteristic can be set. Here, an example is shown in which expected characteristics in which the score 1022 is "maximum" and "minimum" are set for "feature 2" and "feature 3", respectively. A column of the qualitative 1024 corresponds to setting a maximum explanation score as "feature 2" and a minimum explanation score as "feature 3" for a row in which a value of the sample ID 412 is "s1" in the qualitative constraint information table 420 of the qualitative characteristic setting area 1012.

The calibration start button 1060 is a button for starting calibration with contents set on the data expected characteristic setting screen 1000 by being pressed. The cancel button 1070 is a button for canceling setting on the qualitative expected characteristic setting screen 900 by being pressed and returning to the presentation screen 700 in FIG. 7.

As described above, by using the quantitative expected characteristic setting screen 800 in FIG. 8, the qualitative expected characteristic setting screen 900 in FIG. 9, or the data expected characteristic setting screen 1000 in FIG. 10, the calibration parameter setting (step S611) is executed to acquire an expected prediction basis characteristic related to a feature.

Returning to FIG. 6, the predictor creation device 100 determines a combination coefficient for each single predictor by the predictor calibration unit 260 (step S612). Specifically, for example, the predictor creation device 100 determines the combination coefficient for each single predictor based on the extraction parameter information 251 output by the parameter extraction unit 250 in the calibration parameter setting (step S611) and the management target predictor information 242 from the data management unit 240. For example, the combination coefficient for each single predictor is determined based on the following formulas (1) to (7).

$$M(x_i) = \Sigma_k \alpha_k M_k(x_i) \quad (1)$$

where k is an integer from 1 to 100.

The above formula (1) shows a relationship between a predicted value M of an ensemble predictor to be created, a predicted value $M_k$ of a k-th single predictor, and a combination coefficient $\alpha_k$ thereof. $X_i$ is i-th training data in the training data set 202, and is managed in association with the sample ID 412. That is, $M(x_i)$ is a predicted value of an ensemble predictor for training data $x_i$, and $M_k(x_i)$ is a predicted value of the k-th single predictor for the training data $x_i$.

$$R(x_i) = \Sigma_k \alpha_k R_k(x_i) \quad (2)$$

where k is an integer from 1 to 100.

The above formula (2) shows a relationship between a vector (that is, an explanation vector) R based on an explanation score of the ensemble predictor to be created, an explanation vector $R_k$ of the k-th single predictor, and the combination coefficient $\alpha_k$ thereof. That is, $R(x_i)$ is an explanation vector of the ensemble predictor for the training data $x_i$. $R_k(x_i)$ is an explanation vector of the k-th single predictor for the training data $x_i$. The explanation vector R has the same number of dimensions as the number of features of a predictor.

$$J_1 = \Sigma_i L(M_i - Y_i) \quad (3)$$

The above formula (3) shows an objective function (also referred to as a loss function) $J_1$ related to a prediction error of the ensemble predictor. $M_i$ is a predicted value of the ensemble predictor for the i-th training data $x_i$, and is equivalent to $M(x_i)$. $Y_i$ is a ground truth value for the i-th training data $x_i$. L is a function for calculating a norm, and an L2 norm or the like can be used. That is, $L(M_i - Y_i)$ indicates a norm for a difference between a predicted value and a ground truth value for the i-th training data $x_i$.

$$J_2 = \Sigma_i \Sigma_j \lambda_{i,j} L(R_{i,j} - Z_{i,j}) \quad (4)$$

The above formula (4) shows a loss function (or a normalization term) $J_2$ related to a quantitative prediction basis characteristic of the ensemble predictor. $R_{i,f}$ is an explanation score for an f-th feature of the ensemble predictor in the i-th training data $x_i$. For example, when the ensemble predictor is the basic ensemble predictor (eg1), $R_{i,f}$ is an explanation score for an f-th feature in the i-th training data $x_i$ among values (explanation scores) of prediction basis characteristics specified by the prediction basis characteristic ID 312 (r1, r2, . . . , r100) of 100 predictors (p1, p2, . . . , p100) constituting the basic ensemble predictor (eg1).

Z is an expected explanation score managed as the expected explanation score information 413 in the quantitative constraint information table 410. $Z_{i,f}$ is an expected explanation score for the f-th feature in the i-th training data $x_i$. For example, as shown in FIG. 4, if the i-th training data $x_i$ is a sample in which the sample ID 412 is "s2" and the f-th feature is "feature 1", $Z_{i,f}$ is "7.2".

λ is the weight 432 for the constraint managed in the constraint parameter information table 430. $\lambda_{i,f}$ is the weight 432 for an explanation error of the f-th feature in the i-th training data $x_i$. In a case of $Z_{i,f}=7.2$ in the above example, the quantitative constraint ID 411 is "c1", so the weight 432 in which the constraint ID 323 is "c1" is $\lambda_{i,f}=0.7$. Here, the explanation error is a norm of a difference between a current explanation score and an expected explanation score, and is expressed as $L(R_{i,f}-Z_{i,f})$.

$$J_3=\Sigma_i\Sigma_f\lambda_{i,f}L(C_1(R_{i,f},R_{i,f})) \qquad (5)$$

The above formula (5) shows a loss function (or a normalization term) $J_3$ related to constraints of the maximum explanation score and the minimum explanation score, which are qualitative prediction basis characteristics of the ensemble predictor. $C_1$ is a function which returns a value other than 0 when the constraint of the set maximum explanation score or minimum explanation score is not satisfied.

Here, when an expected prediction basis characteristic that the explanation score $R_{i,f}$ for an f'-th feature for the i-th training data $x_i$ is maximum or minimum is given, the function is a simple function which returns "0" if a characteristic thereof is satisfied, and returns "1" if the characteristic is not satisfied as compared with $R_{i,f}$. Certainly, a function which returns a difference between $R_{i,f}$ and $R_{i,f'}$ when not satisfied may be used. Information related to the f'-th feature as a constraint target is managed as the expected qualitative characteristic information 422 in the qualitative constraint information table 420.

For example, as shown in FIG. 4, when the expected qualitative characteristic information 422 is "maximum explanation score" (the qualitative constraint ID 421 is "d1"), if the i-th training data $x_i$ is a sample whose sample ID 412 is "s2", the f'-th feature is "feature 1", and $R_{i,f'}$ become an explanation score for the "feature 1" whose sample ID 412 is "s1", and is compared with $R_{i,f}$.

$$J_4=\Sigma_j\Sigma_i\lambda_{i,f}L(C_2(R_{i,f},R_{*,f})) \qquad (6)$$

The above formula (6) shows a loss function (or a normalization term) $J_4$ related to a constraint of monotonicity which is a qualitative prediction basis characteristic of the ensemble predictor. $C_2$ is a function which returns a value other than 0 when the set constraint of positive or negative monotonicity is not satisfied. Here, it is assumed that the function is a simple function that, when attention is focused on the i-th training data $x_i$ for the f-th feature, an explanation score for the i-th training data $x_i$ (that is, $R_{i,f}$) is compared with an explanation score for all other training data (expressed as $x_{*}$) (that is, $R_{*,f}$), and returns the number of samples for which the constraint of monotonicity set in the explanation score of the f-th feature is not satisfied.

For example, in the case of a constraint of the positive monotonicity, an f-th feature of the i-th training data $x_i$ and an f-th feature of a j-th training data $x_j$ are $F_{i,f}$ and $F_{j,f}$, respectively. When $F_{i,f}$ is smaller than $F_{j,f}$, if $R_{i,f}$ is larger than $R_{j,f}$, a constraint is not satisfied, so that $C_2(R_{i,f},R_{j,f})$ returns "1", and if $R_{i,f}$ is smaller than $R_{j,f}$, $C_2(R_{i,f},R_{j,f})$ returns "0". Certainly, other functions may be used for $C_2$. Constraint information on a prediction basis characteristic related to the monotonicity is managed as the qualitative constraint information table 420.

$$\alpha=\arg\min(\beta_1J_1+\beta_2J_2+\beta_3J_3+\beta_4J_4) \qquad (7)$$

The above formula (7) shows a formula for calculating a combination coefficient vector α. Here, α is a vector having the same number of dimensions as the number of combined predictors (that is, 100 from $\alpha_1$ to $\alpha_{100}$). β is an effective coefficient in the extraction parameter information 251, and is set to "1" when a constraint of a target loss function is set, and is set to "0" when the constraint is not set.

$\beta_1$ is a prediction error. $\beta_2$ is a quantitative prediction basis characteristic. $\beta_3$ is constraints of a maximum explanation score and a minimum explanation score, which are qualitative prediction basis characteristics. $\beta_4$ is an effective coefficient of a loss function related to a constraint of monotonicity, which is a qualitative prediction basis characteristic. That is, α is given as a combination coefficient vector which minimizes a right side of the above formula (7), and the combination coefficient $\alpha_k$ can be easily and quickly calculated by a solution based on partial differentiation for the combination coefficient $\alpha_k$. In this way, the combination coefficient $\alpha_k$ of a new ensemble predictor created by the predictor calibration unit 260 is determined.

The predictor creation device 100 generates, by the predictor calibration unit 260, a new ensemble predictor by setting the determined combination coefficient $\alpha_k$ for each predictor of the basic ensemble predictor (step S613). Information on the created ensemble predictor is output as the calibrated predictor information 261 to the predictor analysis unit 230 and the data management unit 240.

Next, the predictor creation device 100 executes, by the predictor analysis unit 230, predictor characteristic analysis of the ensemble predictor created in step S613 (step S614). Specifically, for example, the predictor creation device 100 calculates, as in step S603, an accuracy score for the test data set 203 and an explanation score for the training data set 202.

The predictor creation device 100 calculates a prediction error (accuracy score) and an explanation error for the ensemble predictor, refers to the allowable prediction error 324 and the allowable explanation error 433 in the extraction parameter information 251 sent from the parameter extraction unit 250, and evaluates whether the accuracy score and the explanation score of the created ensemble predictor achieve desired characteristics, respectively. The predictor creation device 100 stores these analysis results (analysis result information 231) as prediction accuracy characteristic information and prediction basis characteristic information in the data management unit 240.

The predictor creation device 100 refers to the analysis result information 231 obtained in step S613 and determines whether the accuracy score and the explanation score of the created ensemble predictor achieve desired characteristics (step S620). If a desired characteristic is achieved or a set maximum number of times of searches is reached, it is determined that an end condition is satisfied (step S620:

Yes), the predictor creation device 100 presents an analysis result to the user, outputs one or more ensemble predictors (or parameters thereof) created, and ends the processing.

On the other hand, when the desired characteristic is not achieved and the set maximum number of times of searches is not reached (step S620: No), the processing proceeds to step S621.

The predictor creation device 100 updates a value of a random parameter (at least one of the training data set 202 designated by the user and the hyperparameter of the machine learning model) set in the random parameter setting area 540 in step S601, based on a method of giving perturbation to the random parameter (step S621).

The predictor creation device 100 reconstructs the ensemble predictor (step S622). Specifically, for example, the predictor creation device 100 creates a plurality of predictors for addition based on an updated random parameter whose value is updated in step S621. Next, the predictor creation device 100 extracts, based on a predictor selection method set in the ensemble search setting area 730 in step S611, a new group of single predictors used for the ensemble predictor from the plurality of predictors for addition. Then, the predictor creation device 100 adds the extracted new group of single predictors to an existing ensemble predictor. Accordingly, the ensemble predictor is reconstructed. The reconstructed ensemble predictor is set as a new calibration target ensemble predictor.

Thereafter, the predictor creation device 100 sends information related to the extracted new group of single predictors as the predictor information 221 to the predictor analysis unit 230 and the data management unit 240, and returns to step S612. A combination coefficient of the new calibration target ensemble predictor is recalculated in step S612 and reset in step S613.

Thus, according to Embodiment 1, in predicting the ground truth value, the predictor creation device can create, by combining predictors capturing different viewpoints inherent in training data, an ensemble predictor more appropriately capturing an entire event. Since the predictor creation device 100 differentiates an objective function with respect to each combination coefficient of the ensemble predictor, an explanation score or a function of the machine learning model can be handled as a constant. Therefore, the explanation score and the function of the machine learning model do not need to be differentiable. That is, according to Embodiment 1, a prediction basis of a predictor can be calibrated for any explanation score and any machine learning model.

Embodiment 2

Embodiment 2 shows the predictor creation device 100 according to input data (training data, test data) with a data format different from that of Embodiment 1. The input data used in Embodiment 1 is structured data such as table data. In Embodiment 1, an expected prediction basis characteristic is set for a predictor using structured data as the input data. However, there is also a predictor which uses unstructured data such as image data instead of the structured data as the input data. Hereinafter, a unit which sets an expected prediction basis characteristic for a predictor using unstructured data as the input data will be described with reference to FIGS. 11 to 13. In Embodiment 2, differences from Embodiment 1 will be described, and description for the same contents as Embodiment 1 will be omitted.

Figure 11:
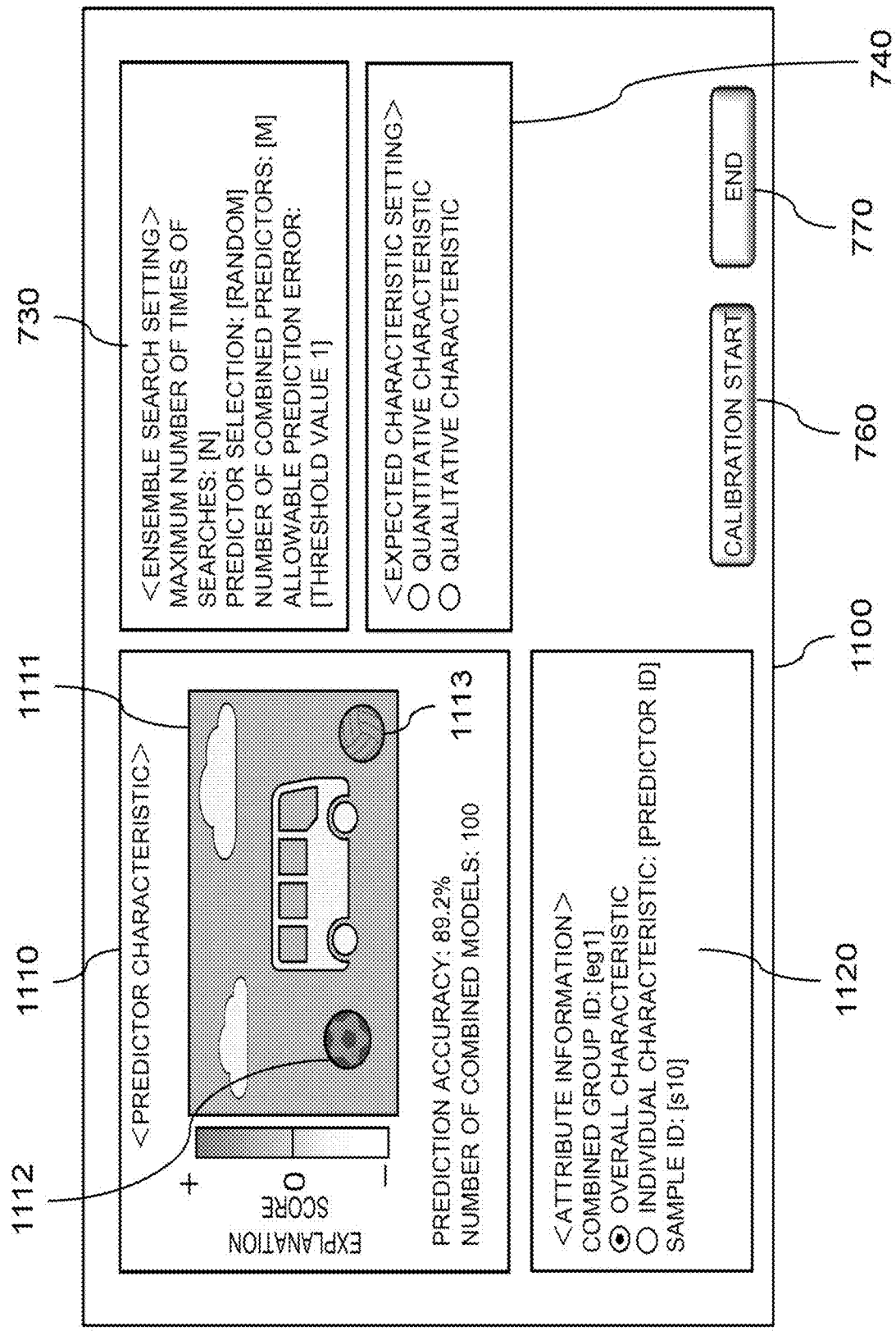
FIG. 11 is a diagram showing an example of a presentation screen of the analysis result information according to Embodiment 2.

FIG. 11 is a diagram showing an example of a presentation screen of the analysis result information 231 according to Embodiment 2. The presentation screen 1100 includes a predictor characteristic presentation area 1110, an attribute information selection area 1120, the ensemble search setting area 730, the expected characteristic setting area 740, the expected characteristic setting button 750, the calibration start button 760, and the end button 770.

The predictor characteristic presentation area 1110 is an area for presenting a characteristic of a predictor to a user, and here, as an example, shows a characteristic of a predictor for determining that there is a soccer ball 1112 in image data 1111. That is, the predictor outputs "1" when determining that there is the soccer ball 1112, and outputs "0" when determining that there is no soccer ball 1112.

When the input data is the image data 1111, a feature corresponds to each pixel in the image data 1111, but it is difficult to understand meaning of an explanation score for each pixel, and it is also inefficient to set an expected prediction basis characteristic in units of pixels. Therefore, here, a method is used in which the image data 1111 is divided into areas in units of objects by segmentation processing, and an expected prediction basis characteristic is set in units of areas.

In the predictor characteristic presentation area 1110, an "explanation score" is expressed by a heat map using color, shade, brightness, transparency, and the like on the image data 1111. In the predictor characteristic presentation area 1110, a positive explanation score is assigned to a volleyball 1113 (area ID1) and the soccer ball 1112 (area ID2). "Prediction accuracy" indicates prediction accuracy of a designated predictor. The "number of combined models" indicates the number of single predictors in the ensemble predictor of the designated combined group ID 314.

The attribute information selection area 1120 is an area in which the predictor and attribute information thereof presented in the predictor characteristic presentation area 1110 can be selected. "Sample ID" is a setting item for designating the image data 1111 to be presented in the predictor characteristic presentation area 1110. Here, the image data 1111 in which a value of the sample ID 412 is "s10" is set.

In addition, since the "combined group ID", the "overall characteristic", and the "individual characteristic" are described in the attribute information selection area 720 of Embodiment 1, description thereof is omitted. Thus, the presentation screen 1100 is the user interface presented in step S604 for a predictor to which the image data 1111 is input.

Figure 12:
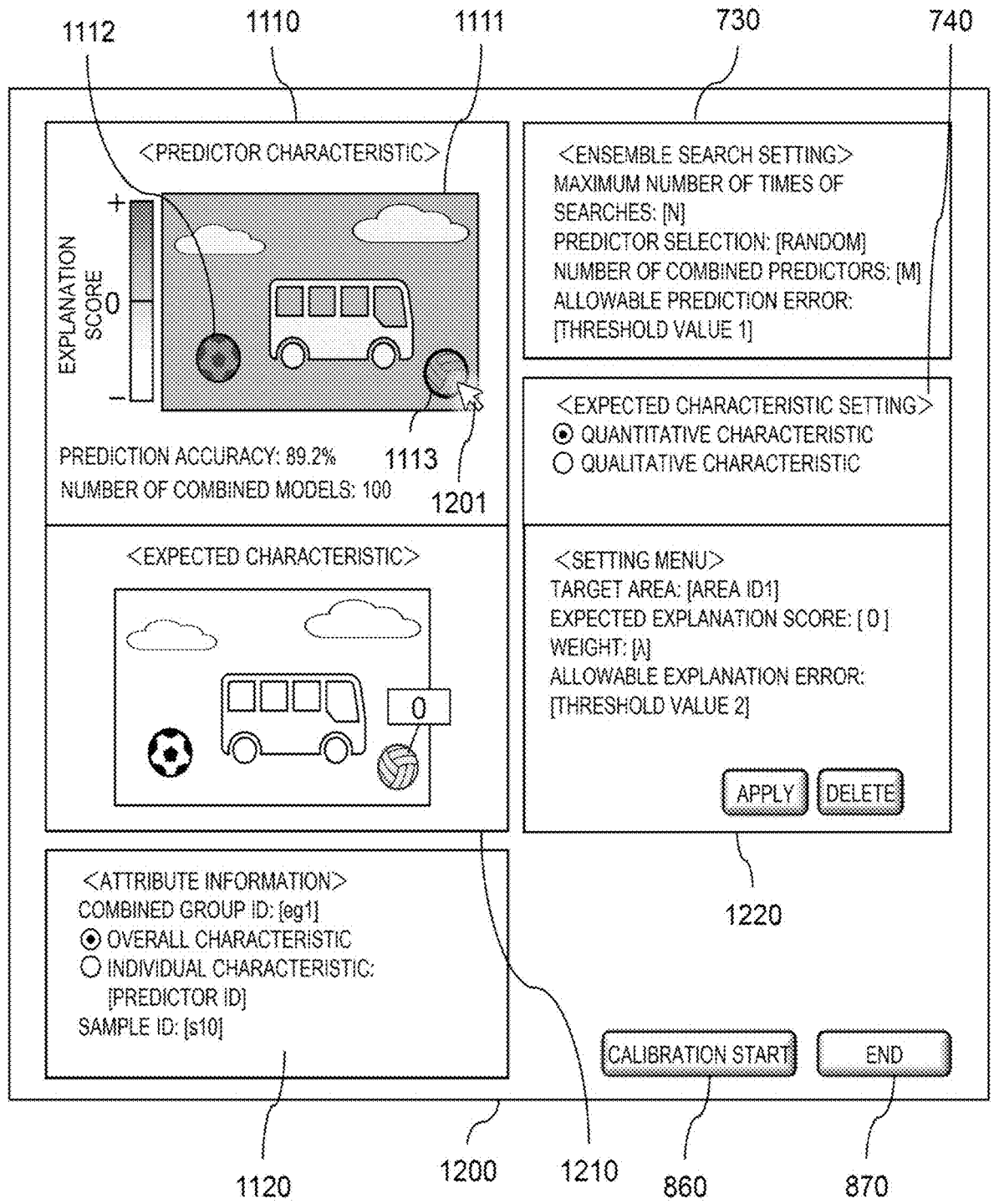
FIG. 12 is a diagram showing an example of a quantitative expected characteristic setting screen according to Embodiment 2.

FIG. 12 is a diagram showing an example of a quantitative expected characteristic setting screen according to Embodiment 2. A quantitative expected characteristic setting screen 1200 is a user interface for setting a quantitative expected characteristic of a predictor to which the image data 1111 is input. The quantitative expected characteristic setting screen 1200 includes a predictor characteristic presentation area 1110, an expected characteristic presentation area 1210, an attribute information selection area 1120, the ensemble search setting area 730, the expected characteristic setting area 740, and a quantitative expected characteristic setting area 1220.

The expected characteristic presentation area 1210 is an area for visually presenting an expected prediction basis characteristic set in the quantitative expected characteristic setting area 1220. In FIG. 11, the quantitative expected characteristic setting area 1220 is displayed when a quantitative characteristic is selected in the expected characteristic setting area 740. The quantitative expected characteristic setting area 1220 is an area for setting a quantitative expected characteristic (that is, quantitative characteristic) for a prediction basis characteristic of image data 1111.

In the quantitative expected characteristic setting area 1220, a "target area" is an area for setting a quantitative characteristic on the image data 1111, and is set by inputting an area ID or designating a position on the image data 1111 of the predictor characteristic presentation area 1110 with a cursor using the input device 103 such as a mouse. Here, an example in which "area ID1" (that is, the volleyball 1113) is set is shown.

In the quantitative expected characteristic setting area 1220, an "expected explanation score" is an explanation score assigned to the "target area" as an expected prediction basis characteristic, and is given by a real number. Here, since it is generally unlikely that presence or absence of the volleyball 1113 affects determination of presence or absence of the soccer ball 1112, an example in which the "expected explanation score" is set to "0" (that is, unrelated to determination) is shown.

In the quantitative expected characteristic setting area 1220, "weight" is a parameter indicating how strongly a set quantitative characteristic is considered, and is usually given by a real value larger than zero. Here, "A" is taken as an example.

In the quantitative expected characteristic setting area 1220, an "allowable explanation error" is a characteristic of an explanation score to be achieved by an ensemble predictor. An index of the explanation error can be given by calculating RMSE or the like in the "target area" for a set expected explanation score and an explanation score of a calibrated ensemble predictor. Thus, the quantitative expected characteristic setting screen 1200 is the user interface presented in step S611 for a predictor to which the image data 1111 is input.

Figure 13:
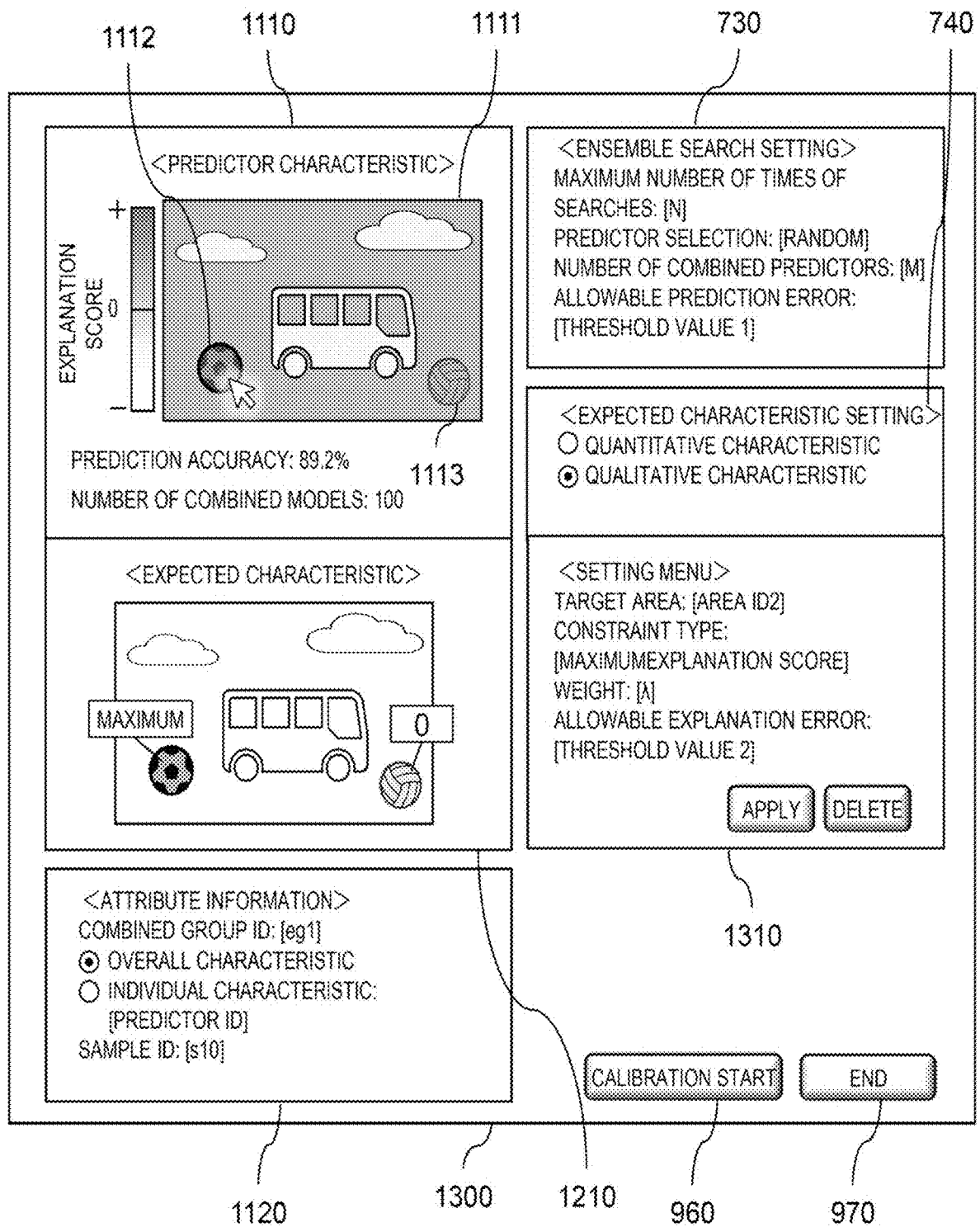
FIG. 13 is a diagram showing an example of a qualitative expected characteristic setting screen according to Embodiment 2.

FIG. 13 is a diagram showing an example of a qualitative expected characteristic setting screen according to Embodiment 2. A qualitative expected characteristic setting screen 1300 is a user interface for setting a qualitative expected characteristic of a predictor to which the image data 1111 is input. The qualitative expected characteristic setting screen 1300 includes the predictor characteristic presentation area 1110, the expected characteristic presentation area 1210, the attribute information selection area 1120, the ensemble search setting area 730, the expected characteristic setting area 740, and an expected qualitative characteristic setting area 1310.

In FIG. 13, the expected qualitative characteristic setting area 1310 is displayed when a qualitative characteristic is selected in the expected characteristic setting area 740. Here, an example in which the area ID2 (that is, the soccer ball 1112) is set as the "target area" is shown.

In the expected qualitative characteristic setting area 1310, a "constraint type" indicates a type of a qualitative characteristic to be set. In determining presence or absence of the soccer ball 1112, an explanation score of an area of the soccer ball 1112 is to be larger than that of the other areas. Therefore, here is an example where (an expected characteristic (or constraint) of) a "maximum explanation score" is set in the "constraint type". A setting result here is reflected and presented in the expected characteristic presentation area 1210 including a setting result of the quantitative expected characteristic setting area 1220. This promotes the user to visually understand a setting state of an expected prediction basis characteristic. Thus, the qualitative expected characteristic setting screen 1300 is the user interface presented in step S611 for a predictor to which the image data 1111 is input.

Thus, according to Embodiment 2, it is possible to set an expected prediction basis characteristic for a predictor which uses unstructured data such as the image data 1111 as input data.

The predictor creation device 100 according to Embodiment 1 and Embodiment 2 described above can also be configured as described in the following (1) to (13).

(1) The predictor creation device 100 includes: the processor 101 configured to execute a program; and the storage device 102 which stores the program. The processor 101 executes first acquisition processing (step S602) of acquiring a calibration target ensemble predictor (basic ensemble predictor) obtained by combining a plurality of predictors based on the training data set 202 which is a combination of training data and ground truth data, calculation processing (step S603) of calculating a prediction basis characteristic related to a feature of the training data for each of the plurality of predictors, second acquisition processing (step S604, step S610, step S611) of acquiring an expected prediction basis characteristic related to the feature based on the prediction basis characteristic related to the feature as a result (quantitative expected characteristic setting screen 800, qualitative expected characteristic setting screen 900) of outputting the prediction basis characteristic (specified by the prediction basis characteristic ID 312) related to the feature calculated by the calculation processing, determination processing (step S612) of determining a combination coefficient $\alpha_k$ of each of the plurality of predictors based on the prediction basis characteristic related to the feature and the expected prediction basis characteristic (set on the quantitative expected characteristic setting screen 800 and the qualitative expected characteristic setting screen 900) related to the feature acquired in the second acquisition processing, and calibration processing (step S613) of calibrating the calibration target ensemble predictor based on the combination coefficient $\alpha_k$ determined by the determination processing.

(2) In the predictor creation device 100 according to the above (1), in the determination processing, the processor 101 calculates a loss function ($J_2$, $J_3$ or $J_4$) related to a prediction basis characteristic of the calibration target ensemble predictor based on a prediction basis characteristic related to the feature and an expected prediction basis characteristic related to the feature, and determines a combination coefficient $\alpha_k$ of the plurality of predictors based on the loss function ($J_2$, $J_3$ or $J_4$).

(3) In the predictor creation device 100 according to the above (2), in the second acquisition processing, the processor 101 acquires a quantitative expected prediction basis characteristic (quantitative constraint information 401, 402, 403, . . . ) related to the feature, and in the determination processing, the processor 101 calculates a loss function $J_2$ related to a quantitative prediction basis characteristic of the calibration target ensemble predictor based on a prediction basis characteristic related to the feature and a quantitative expected prediction basis characteristic related to the feature, and determines a combination coefficient $\alpha_k$ of the plurality of predictors based on the loss function $J_2$.

(4) In the predictor creation device 100 according to the above (3), in the second acquisition processing, the processor 101 acquires a quantitative expected prediction basis characteristic related to the feature input (handwriting input) by a user operation.

(5) In the predictor creation device 100 according to the above (3), in the second acquisition processing, the processor 101 acquires a quantitative expected prediction basis characteristic related to the feature based on an effective range of the feature set by a user operation and a prediction basis characteristic related to the feature.

(6) In the predictor creation device 100 according to the above (3), in the second acquisition processing, the processor 101 acquires a quantitative expected prediction basis characteristic related to the feature after correction as a result (data expected characteristic setting screen 1000) of outputting a quantitative expected prediction basis characteristic related to the feature, and in the determination processing, the processor 101 calculates the loss function $J_2$ based on a prediction basis characteristic related to the feature and a quantitative expected prediction basis characteristic related to the feature, and determines a combination coefficient $\alpha_k$ of the plurality of predictors based on the loss function $J_2$.

(7) In the predictor creation device 100 according to the above (2), in the second acquisition processing, the processor 101 acquires a qualitative expected prediction basis characteristic (qualitative constraint information 441 to 444) related to the feature, and in the determination processing, the processor 101 calculates a loss function ($J_3$ or $J_4$) related to a qualitative prediction basis characteristic of the calibration target ensemble predictor based on a prediction basis characteristic related to the feature and a qualitative expected prediction basis characteristic related to the feature, and determines a combination coefficient $\alpha_k$ of the plurality of predictors based on the loss function ($J_3$ or $J_4$).

(8) In the predictor creation device 100 according to the above (7), a loss function related to the qualitative prediction basis characteristic is a loss function $J_3$ related to constraints of a maximum value (maximum explanation score) and a minimum value (minimum explanation score) as the prediction basis characteristic.

(9) In the predictor creation device 100 according to the above (7), a loss function related to the qualitative prediction basis characteristic is a loss function $J_4$ related to a constraint of monotonicity as the prediction basis characteristic.

(10) In the predictor creation device 100 according to the above (7), the processor 101 acquires a qualitative expected prediction basis characteristic related to the feature after correction as a result (data expected characteristic setting screen 1000) of outputting a qualitative expected prediction basis characteristic related to the feature, and in the determination processing, the processor 101 calculates the loss function ($J_3$ or $J_4$) based on a prediction basis characteristic related to the feature and a qualitative expected prediction basis characteristic related to the feature, and determines a combination coefficient $\alpha_k$ of the plurality of predictors based on the loss function ($J_3$ or $J_4$).

(11) In the predictor creation device 100 according to the above (2), the training data is unstructured data (image data 1111), and in the acquisition processing, the processor 101 acquires a quantitative expected prediction basis characteristic related to the feature based on a prediction basis characteristic related to the feature, which is selected from a specific area (soccer ball 1112, volleyball 1113) in the unstructured data, as a result (quantitative expected characteristic setting screen 1200) of outputting the unstructured data and a prediction basis characteristic related to the feature calculated by the calculation processing.

(12) In the predictor creation device 100 according to the above (1), the processor 101 executes setting processing (step S622) of performing a setting for the calibration target ensemble predictor by adding one or more predictors to the ensemble predictor calibrated by the calibration processing, determines, in the determination processing, a combination coefficient of each of the plurality of predictors based on a prediction basis characteristic of each of the plurality of predictors in the calibration target ensemble predictor set in the setting processing, and calibrates, in the calibration processing, the calibration target ensemble predictor based on the combination coefficient of each of the plurality of predictors determined by the determination processing.

(13) In the predictor creation device 100 according to the above (12), in the setting processing, the processor 101 performs the setting for the calibration target ensemble predictor until the calibrated ensemble predictor satisfies a predetermined condition (step S620).

The invention is not limited to the above-described embodiments and includes various modifications and equivalent configurations within the spirit of the appended claims. For example, the above-mentioned embodiment is described in detail in order to make the invention easy to understand, and the invention is not necessarily limited to those including all the configurations described above. A part of the configurations of a certain embodiment may be replaced with a configuration of another embodiment. A configuration of another embodiment may be added to a configuration of a certain embodiment. A part of a configuration of each embodiment may be added to, deleted from, or replaced by another configuration.

Parts or all of configurations, functions, processing units, processing methods described above and the like may be implemented by hardware, for example by designing with an integrated circuit, or may be implemented by software, with the processor 101 to interpret and execute a program for implementing each function.

Information on a program, a table, and a file for implementing each function can be stored in a storage device such as a memory, a hard disk, and a solid state drive (SSD), or a recording medium such as an integrated circuit (IC) card, an SD card, and a digital versatile disc (DVD).

Control lines and information lines indicate what is considered necessary for description, and not all the control lines and the information lines are necessarily shown in a product. In fact, it may be considered that almost all configurations are coupled to each other.

The invention claimed is:
1. A machine-learning predictor creation device comprising:
a storage device that stores a program; and
a processor which when executing the program configures the processor to:
execute a first acquisition processing of acquiring a calibration target ensemble predictor obtained by combining a plurality of predictors based on a training data set which is a combination of training data and ground truth data,
execute a calculation processing of calculating a prediction basis characteristic related to a feature of the training data for each of the plurality of predictors, execute a second acquisition processing of acquiring an expected prediction basis characteristic related to the feature based on the prediction basis characteristic related to the feature as a result of outputting the prediction basis characteristic related to the feature calculated by the calculation processing, execute determination processing of determining a combination coefficient of each of the plurality of predictors based on the prediction basis characteristic related to the feature and the expected prediction basis characteristic related to the feature acquired in the second acquisition processing, and execute calibration processing of calibrating the calibration target ensemble predictor based on the combination coefficient determined by the determination processing, wherein in executing the determination processing, the processor calculates a loss function related to the prediction basis characteristic of the calibration target ensemble predictor based on the prediction basis characteristic related to the feature and the expected prediction basis characteristic related to the feature, and determines a combination coefficient of the plurality of predictors based on the loss function, in executing the second acquisition processing, the processor acquires a quantitative expected prediction basis characteristic related to the feature, in executing the determination processing, the processor calculates a loss function $J_2$ related to a quantitative prediction basis characteristic of the calibration target ensemble predictor based on the prediction basis characteristic related to the feature and the quantitative expected prediction basis characteristic related to the feature, and determines a combination coefficient of the plurality of predictors based on the loss function, and $$J_2 = \Sigma_i \Sigma_f \lambda_{i,f} L(R_{i,f} - Z_{i,f}),$$

where $R_{i,f}$ is an explanation score for an f-th feature of the ensemble predictor in an i-th training data $x_i$, $Z_{i,f}$ is an expected explanation score for the f-th feature in the i-th training data $x_i$, $\lambda$ is the weight for the constraint managed in the constraint parameter information table, and L is a function for calculating a norm.

2. The machine-learning predictor creation device according to claim 1, wherein in executing the second acquisition processing, the processor acquires the quantitative expected prediction basis characteristic related to the feature input by a user operation.

3. The machine-learning predictor creation device according to claim 1, wherein in executing the second acquisition processing, the processor acquires the quantitative expected prediction basis characteristic related to the feature based on an effective range of the feature set by a user operation and the prediction basis characteristic related to the feature.

4. The machine-learning predictor creation device according to claim 1, wherein in executing the second acquisition processing, the processor acquires the quantitative expected prediction basis characteristic related to the feature after correction as a result of outputting the quantitative expected prediction basis characteristic related to the feature, and in executing the determination processing, the processor calculates the loss function based on the prediction basis characteristic related to the feature and the quantitative expected prediction basis characteristic related to the feature, and determines a combination coefficient of the plurality of predictors based on the loss function.

5. The machine-learning predictor creation device according to claim 1, wherein in executing the second acquisition processing, the processor acquires a qualitative expected prediction basis characteristic related to the feature, and in executing the determination processing, the processor calculates a loss function related to a qualitative prediction basis characteristic of the calibration target ensemble predictor based on the prediction basis characteristic related to the feature and the qualitative expected prediction basis characteristic related to the feature, and determines a combination coefficient of the plurality of predictors based on the loss function.

6. The machine-learning predictor creation device according to claim 5, wherein a loss function related to the qualitative prediction basis characteristic is a loss function related to constraints of a maximum value and a minimum value as the prediction basis characteristic.

7. The machine-learning predictor creation device according to claim 5, wherein a loss function related to the qualitative prediction basis characteristic is a loss function related to a constraint of monotonicity as the prediction basis characteristic.

8. The machine learning predictor creation device according to claim 5, wherein in executing the second acquisition processing, the processor acquires the qualitative expected prediction basis characteristic related to the feature after correction as a result of outputting the qualitative expected prediction basis characteristic related to the feature, and in executing the determination processing, the processor calculates the loss function based on the prediction basis characteristic related to the feature and the qualitative expected prediction basis characteristic related to the feature, and determines a combination coefficient of the plurality of predictors based on the loss function.

9. The machine-learning predictor creation device according to claim 1, wherein the training data is unstructured data, and in executing the second acquisition processing, the processor acquires the expected prediction basis characteristic related to the feature based on the prediction basis characteristic related to the feature, which is selected from a specific area in the unstructured data, as a result of outputting the unstructured data and the prediction basis characteristic related to the feature calculated by the calculation processing.

10. The machine-learning predictor creation device according to claim 1, wherein the processor is further configured to:

execute setting processing of performing a setting for the calibration target ensemble predictor by adding one or more predictors to the ensemble predictor calibrated by the calibration processing, determine, in executing the determination processing, a combination coefficient of each of the plurality of predictors based on a prediction basis characteristic of each of the plurality of predictors in the calibration target ensemble predictor set in the setting processing, and calibrate, in executing the calibration processing, the calibration target ensemble predictor based on the combination coefficient of each of the plurality of predictors determined by the determination processing.

11. The machine-learning predictor creation device according to claim 10, wherein
in executing the setting processing, the processor performs a setting for the calibration target ensemble predictor until the calibrated ensemble predictor satisfies a predetermined condition.

12. A predictor creation method executed by a machine-learning predictor creation device including a storage device that stores a program which when executed by a processor configures the processor to perform the predictor creation method comprising the steps of:
executing first acquisition processing of acquiring a calibration target ensemble predictor obtained by combining a plurality of predictors based on a training data set which is a combination of training data and ground truth data;
executing calculation processing of calculating a prediction basis characteristic related to a feature of the training data for each of the plurality of predictors;
executing second acquisition processing of acquiring an expected prediction basis characteristic related to the feature based on the prediction basis characteristic related to the feature as a result of outputting the prediction basis characteristic related to the feature calculated by the calculation processing;
executing determination processing of determining a combination coefficient of each of the plurality of predictors based on the prediction basis characteristic related to the feature and the expected prediction basis characteristic related to the feature acquired in the second acquisition processing; and
executing calibration processing of calibrating the calibration target ensemble predictor based on the combination coefficient determined by the determination processing, wherein
in executing the determination processing, the processor calculates a loss function related to the prediction basis characteristic of the calibration target ensemble predictor based on the prediction basis characteristic related to the feature and the expected prediction basis characteristic related to the feature, and determines a combination coefficient of the plurality of predictors based on the loss function,
in executing the second acquisition processing, the processor acquires a quantitative expected prediction basis characteristic related to the feature,
in executing the determination processing, the processor calculates a loss function $J_2$ related to a quantitative prediction basis characteristic of the calibration target ensemble predictor based on the prediction basis characteristic related to the feature and the quantitative expected prediction basis characteristic related to the feature, and determines a combination coefficient of the plurality of predictors based on the loss function, and $$J_2 = \Sigma_i \Sigma_f \lambda_{i,f} L(R_{i,f} - Z_{i,f}),$$

where
$R_{i,f}$ is an explanation score for an f-th feature of the ensemble predictor in an i-th training data $x_i$,
$Z_{i,f}$ is an expected explanation score for the f-th feature in the i-th training data $x_i$,
$\lambda$ is the weight for the constraint managed in the constraint parameter information table, and
L is a function for calculating a norm.

* * * * *